(12) United States Patent
Itagaki

(10) Patent No.: US 10,484,555 B2
(45) Date of Patent: Nov. 19, 2019

(54) IMAGE FORMING APPARATUS COMMUNICABLY CONNECTED TO AN EXTERNAL MEASUREMENT DEVICE THAT MEASURES A MEASUREMENT IMAGE FOR A CALIBRATION OPERATION, AND A RELATED IMAGE PROCESSING APPARATUS

(71) Applicant: CANON KABUSHIKI KAISHA, Tokyo (JP)

(72) Inventor: Tomohisa Itagaki, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/997,119

(22) Filed: Jun. 4, 2018

(65) Prior Publication Data
US 2018/0359380 A1  Dec. 13, 2018

(30) Foreign Application Priority Data

Jun. 8, 2017 (JP) .................................. 2017-113637
Jul. 3, 2017 (JP) .................................. 2017-130521

(51) Int. Cl.
| | |
|---|---|
| H04N 1/00 | (2006.01) |
| G03G 15/08 | (2006.01) |
| H04N 1/028 | (2006.01) |
| G03G 15/20 | (2006.01) |
| G03G 15/00 | (2006.01) |

(52) U.S. Cl.
CPC ....... *H04N 1/00588* (2013.01); *G03G 15/087* (2013.01); *G03G 15/0848* (2013.01); *G03G 15/0887* (2013.01); *G03G 15/2028* (2013.01); *G03G 15/5062* (2013.01); *H04N 1/00031* (2013.01); *H04N 1/0283* (2013.01)

(58) Field of Classification Search
CPC ............ H04N 1/00588; H04N 1/0283; H04N 1/00031; G03G 15/087; G03G 15/2028; G03G 15/0887; G03G 15/0848
See application file for complete search history.

(56) References Cited

U.S. PATENT DOCUMENTS

| | | | |
|---|---|---|---|
| 2005/0151974 A1* | 7/2005 | Butterfield | ......... H04N 1/00058 356/448 |
| 2014/0160498 A1 | 6/2014 | Yano | |
| 2017/0104884 A1* | 4/2017 | Hayashi | ............. H04N 1/00816 |
| 2018/0341208 A1* | 11/2018 | Nakamura | ......... G03G 15/5062 |

FOREIGN PATENT DOCUMENTS

JP  2014-113810 A  6/2014

* cited by examiner

*Primary Examiner* — Neil R McLean
(74) *Attorney, Agent, or Firm* — Venable LLP

(57) ABSTRACT

An image forming apparatus includes a printer, a sensor that measures a measurement image, and a controller that selects a layout including a plurality of test images and a separator, controls the printer to print the plurality of test images and the separator on the sheet, controls the sensor to measure the plurality of test images, and obtains measurement data related to the plurality of test images. The controller also generates a conversion condition based on the measurement result of the plurality of test images and the obtained measurement data. The conversion condition is used to convert the measurement result of the plurality of test images into a measurement result of an external measurement device.

18 Claims, 20 Drawing Sheets

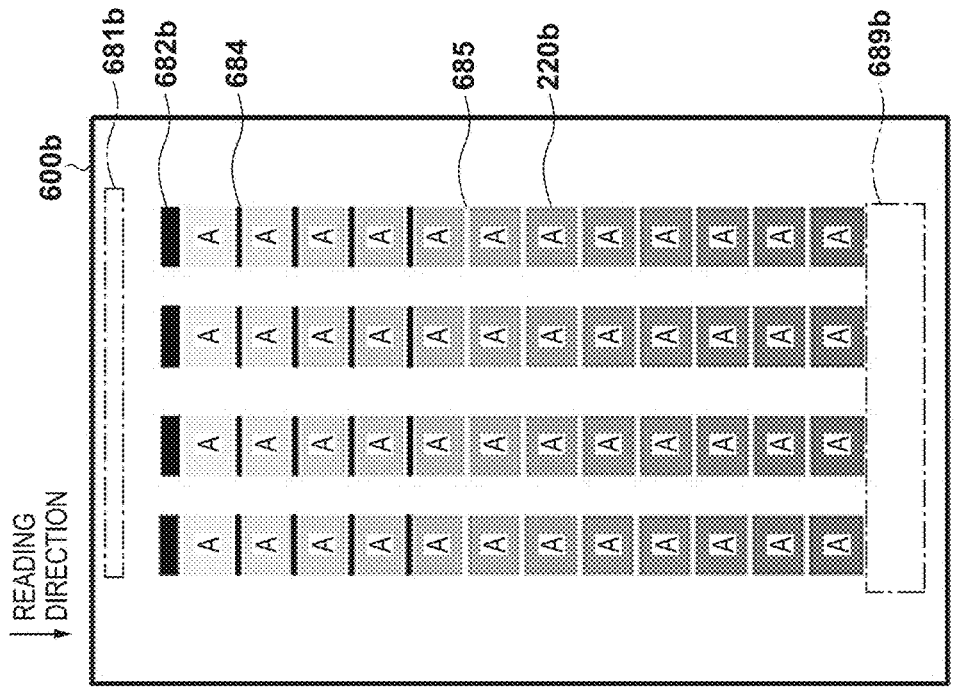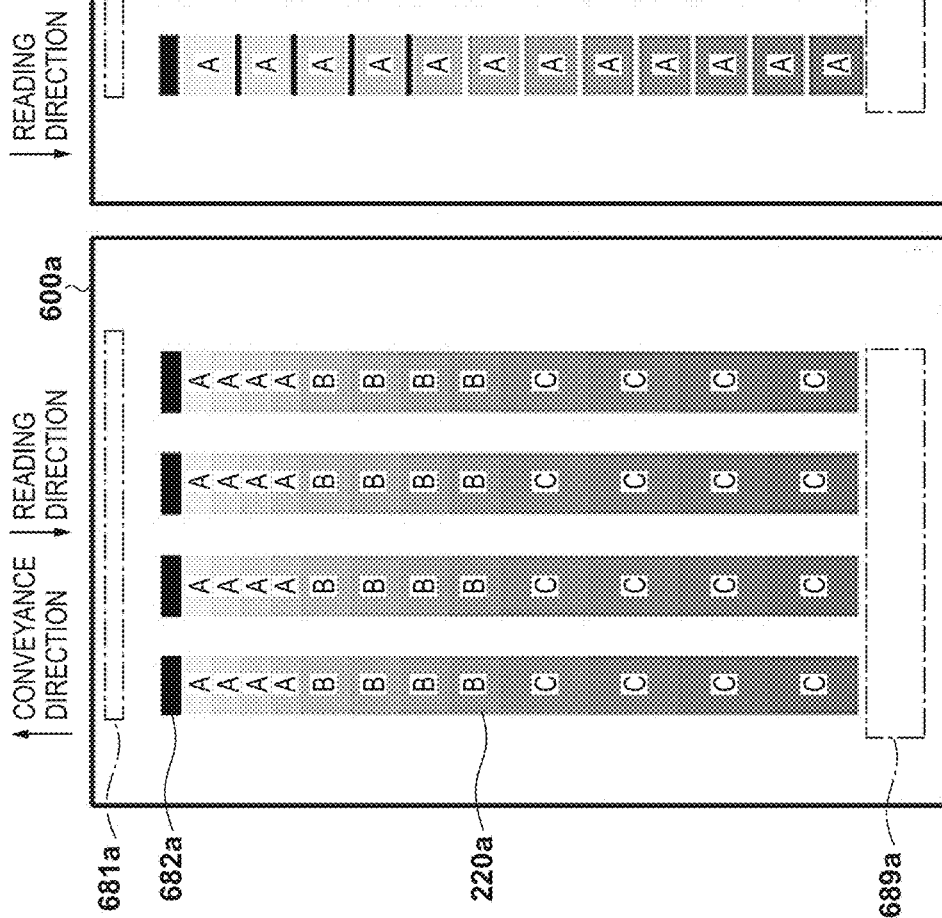

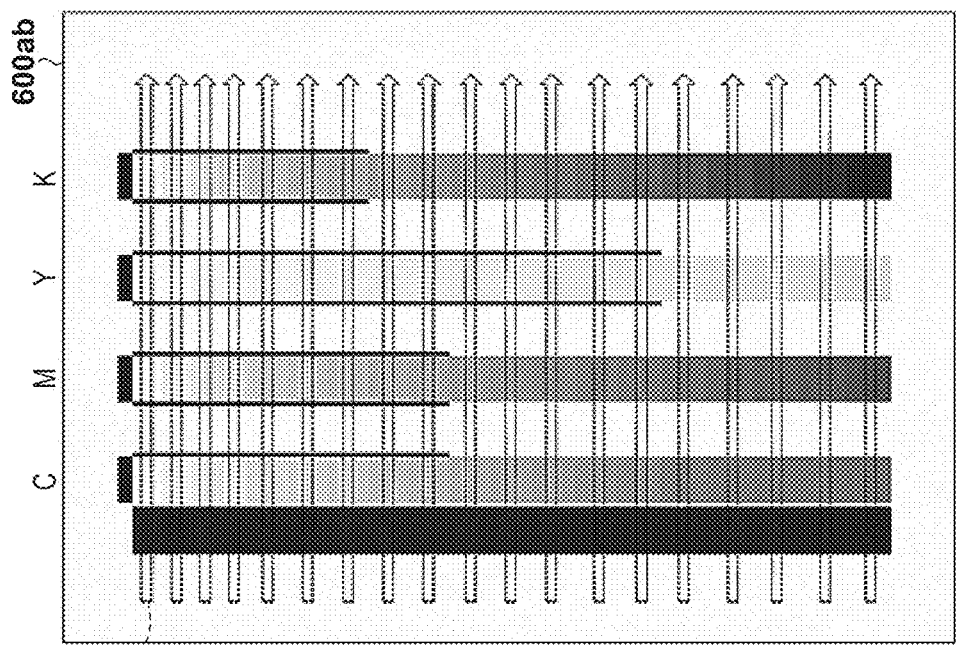
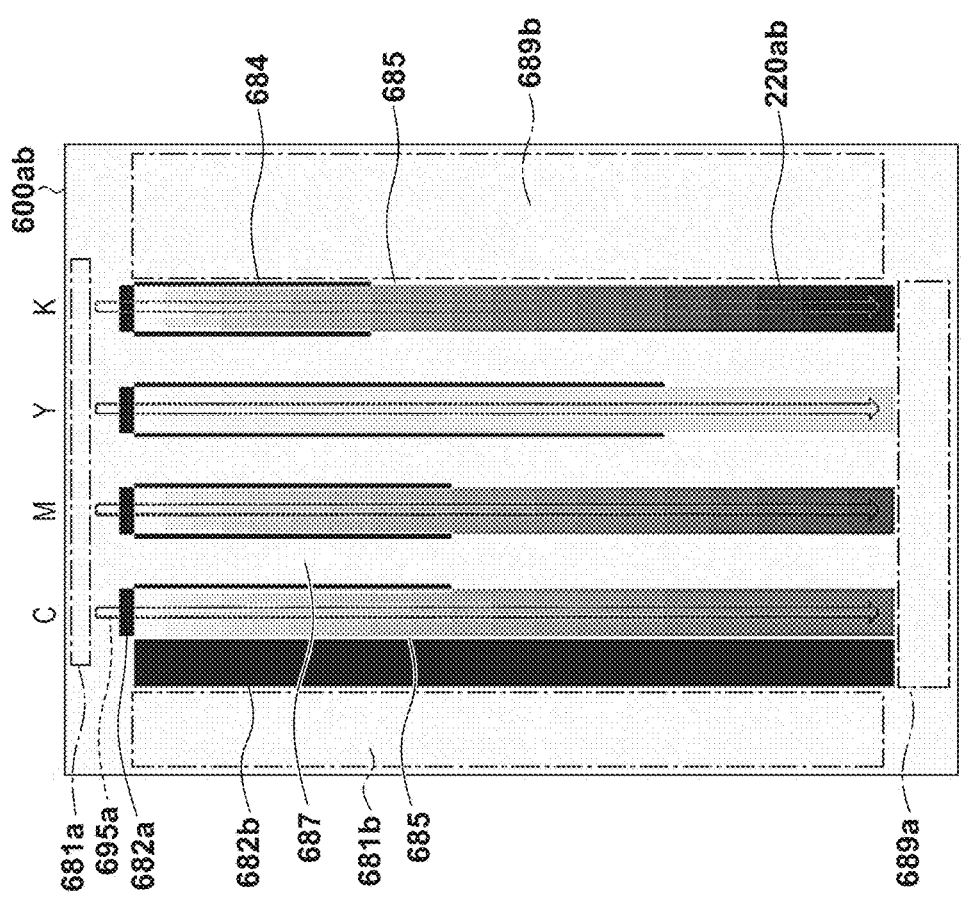

FIG 7

| SUB-SCAN ADDRESS | C | W (Visual D) | M | W (Visual D) | Y | W (Visual D) | K |
|---|---|---|---|---|---|---|---|
| 1 | 0.10 | 0.07 | 0.09 | 0.08 | 0.02 | 0.08 | 0.07 |
| 2 | 0.18 | 0.08 | 0.17 | 0.07 | 0.08 | 0.07 | 0.15 |
| 3 | 0.26 | 0.07 | 0.25 | 0.07 | 0.14 | 0.07 | 0.23 |
| 4 | 0.35 | 0.07 | 0.34 | 0.08 | 0.20 | 0.08 | 0.32 |
| 5 | 0.43 | 0.08 | 0.42 | 0.07 | 0.26 | 0.08 | 0.40 |
| 6 | 0.51 | 0.07 | 0.50 | 0.07 | 0.32 | 0.07 | 0.48 |
| 7 | 0.59 | 0.07 | 0.58 | 0.08 | 0.38 | 0.07 | 0.56 |
| 8 | 0.69 | 0.08 | 0.68 | 0.08 | 0.44 | 0.08 | 0.66 |
| 9 | 0.77 | 0.07 | 0.76 | 0.07 | 0.50 | 0.08 | 0.74 |
| 10 | 0.85 | 0.07 | 0.84 | 0.07 | 0.56 | 0.07 | 0.82 |
| 11 | 0.93 | 0.08 | 0.92 | 0.08 | 0.62 | 0.07 | 0.90 |
| 12 | 1.02 | 0.07 | 1.01 | 0.07 | 0.68 | 0.07 | 0.99 |
| 13 | 1.10 | 0.08 | 1.09 | 0.08 | 0.74 | 0.07 | 1.07 |
| 14 | 1.19 | 0.07 | 1.18 | 0.07 | 0.80 | 0.07 | 1.16 |
| 15 | 1.27 | 0.07 | 1.26 | 0.08 | 0.86 | 0.08 | 1.24 |
| 16 | 1.35 | 0.08 | 1.34 | 0.07 | 0.92 | 0.08 | 1.32 |
| 17 | 1.43 | 0.07 | 1.42 | 0.07 | 0.98 | 0.07 | 1.40 |
| 18 | 1.51 | 0.07 | 1.50 | 0.08 | 1.04 | 0.07 | 1.48 |
| 19 | 1.61 | 0.08 | 1.60 | 0.07 | 1.10 | 0.08 | 1.58 |

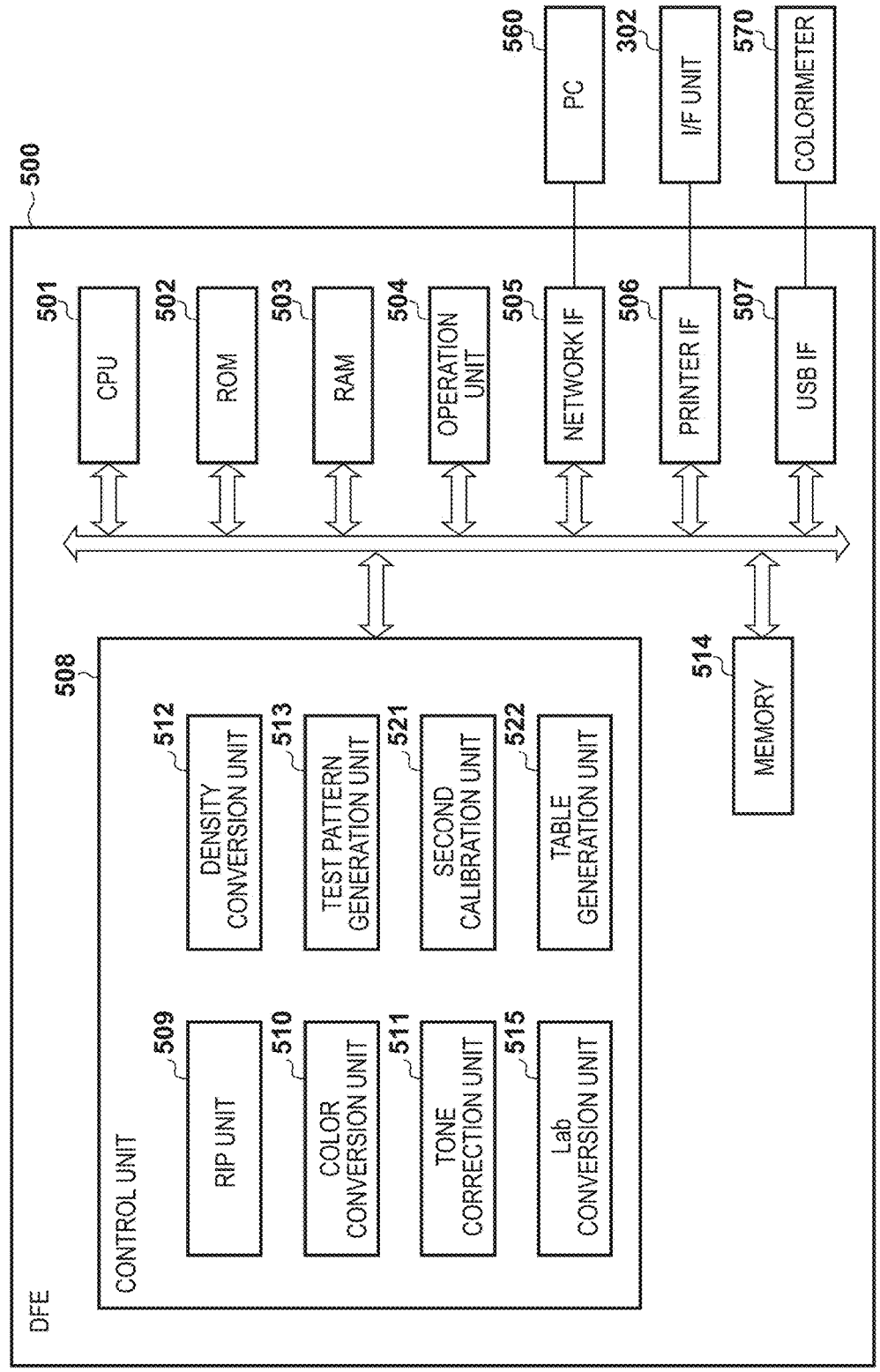

FIG. 13

| | INLINE SENSOR (CORRECTION TARGET) | | | COLORIMETER (TARGET) | |
|---|---|---|---|---|---|
| MODEL | TYPE A | TYPE B | TYPE C | TYPE α | TYPE β |
| SENSOR | SPECTRAL REFLECTANCE SENSOR | RGB SENSOR | | SPECTRAL REFLECTANCE SENSOR | |
| NUMBER OF SENSORS | 4 | 4 | 2 | 1 | — |
| POSITION BAR | 1 | 2 | | | |
| SCANNING DIRECTION SIZE | FIXED SIZE | FIXED SIZE | | ARBITRARY SIZE | |
| PATCH UNIFORMITY | UNNECESSARY | NECESSARY | | NECESSARY | |
| MEASUREMENT TIMING | SPECIFIED TIMING BASED ON POSITION BAR | | | AUTOMATIC DECISION BASED ON SEPARATOR | AUTOMATIC DECISION |
| CONVEYANCE MARKER | UNNECESSARY | | | UNNECESSARY | NECESSARY |

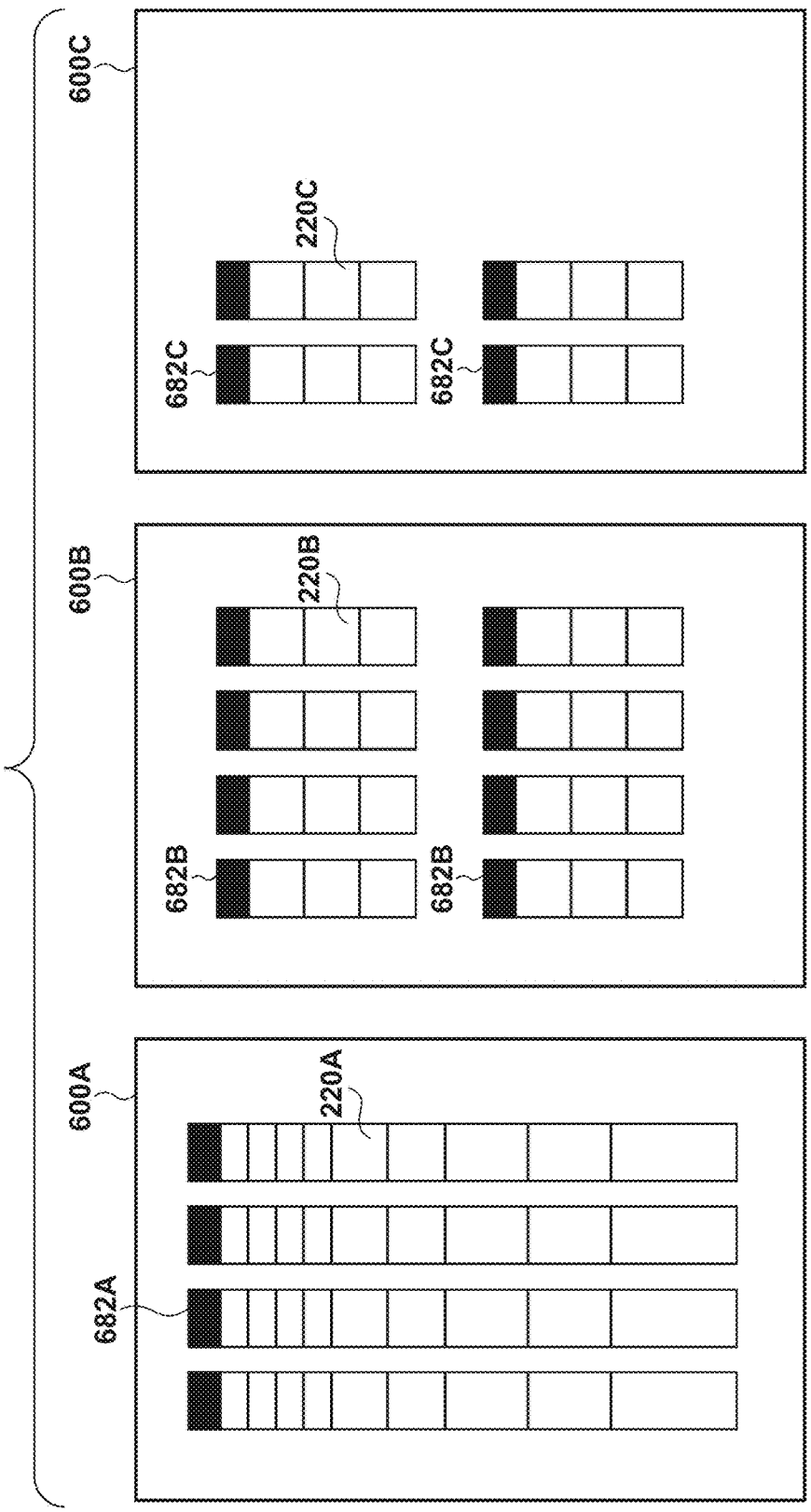

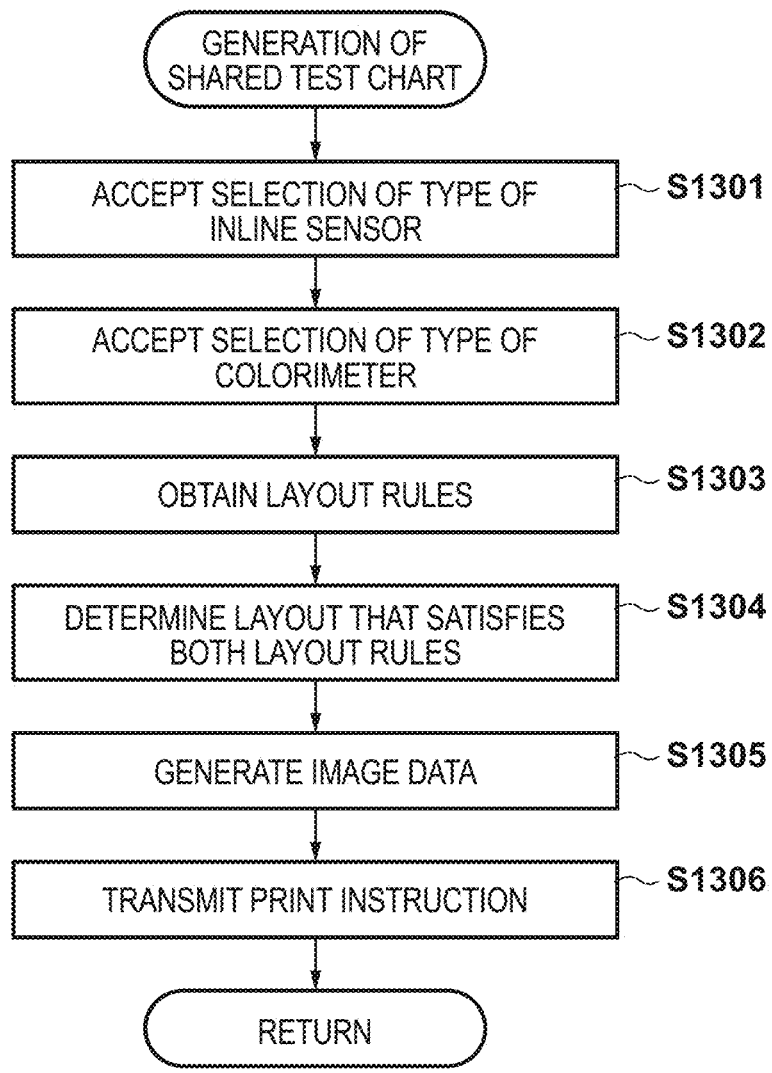

FIG. 17A

GENERATE DENSITY CONVERSION TABLE

1401 PLEASE SELECT TYPE OF INLINE SENSOR
- ● TYPE A
- ○ TYPE B
- ○ TYPE C

1402 PLEASE SELECT TYPE OF COLORIMETER
- ● TYPE α
- ○ TYPE β

[1403 GENERATE] [CANCEL]

FIG. 17B

GENERATE DENSITY CONVERSION TABLE

1401 PLEASE SELECT TYPE OF INLINE SENSOR
- ● TYPE A
- ○ TYPE B
- ○ TYPE C

1402 PLEASE SELECT TYPE OF COLORIMETER
- ● TYPE α
- ○ TYPE β

[1404 NAME AND SAVE] [1403 GENERATE] [CANCEL]

IMAGE FORMING APPARATUS COMMUNICABLY CONNECTED TO AN EXTERNAL MEASUREMENT DEVICE THAT MEASURES A MEASUREMENT IMAGE FOR A CALIBRATION OPERATION, AND A RELATED IMAGE PROCESSING APPARATUS

This application claims the benefit of Japanese Patent Application No. 2017-113637, filed on Jun. 8, 2017, and Japanese Patent Application No. 2017-130521, filed Jul. 3, 2017, which are hereby incorporated by reference herein in their entireties.

BACKGROUND OF THE INVENTION

Field of the Invention

The present invention relates to an image forming apparatus configured to execute a calibration operation using a measurement image, and to a related image processing apparatus.

Description of the Related Art

An electrophotographic printer engine forms an electrostatic latent image on a photosensitive member based on image data, and then forms an image by developing the electrostatic latent image using a developing agent within a developer. A tone correction is necessary because the density of the image differs depending on the state of the printer engine. The tone correction is a calibration operation for maintaining the image density at a predetermined desired density. An image forming apparatus disclosed in U.S. Patent Application Publication No. 2014/0160498 performs tone correction after a scanner (inline sensor) provided in the image forming apparatus reads a measurement image formed on a sheet.

Incidentally, tone characteristics of an image differ in accordance with the type of sheet (the existence or absence of a coating, the grammage, or the like). The image forming apparatus disclosed in U.S. Patent Application Publication No. 2014/0160498 additionally executes a calibration for each type of sheet and generates a tone correction table for each type of sheet. In particular, a measurement image formed on a sheet by the image forming apparatus is read by an external scanner connected to a print server.

In the foregoing calibration operation, a target tone characteristic (target tone) for each type of sheet is determined in advance and a tone correction table is generated so that a target tone is maintained. It is often the case that an operator desires to use a familiar commercial colorimeter (example: X-Rite i1Pro2) in order to determine the target tone. Meanwhile, a colorimeter may be used and an inline sensor may be used in the previously described calibration.

If an inline sensor provided in the image forming apparatus can measure the test chart in the previously described calibration operation, it is not necessary for the operator to manually measure the test chart. There are operators, however, who wish to perform the previously described calibration operation using the result of measuring the test chart by a colorimeter. In such a case, a conversion table for converting the measurement result by the inline sensor into a colorimeter measurement result is necessary. In order to generate the conversion table, a test chart for an inline sensor and a test chart for a colorimeter are respectively necessary. This is because measurement rules (such as rules for sizing and spacing of the test image) of the inline sensor and measurement rules of the colorimeter are different.

SUMMARY OF THE INVENTION

The present invention provides an image forming apparatus connected communicably to an external measurement device. The apparatus may comprise the following structures. A printer is configured to print an image on a sheet. A sensor is provided on a conveyance path along which the sheet is conveyed, and is configured to measure a measurement image printed on the sheet by the printer. A controller is configured to control the printer to print a plurality of test images and a separator on the sheet, the separator being used to control a measurement timing of an external measurement device, to control the sensor to measure the plurality of test images on the sheet, to obtain measurement data related to the plurality of test images, the measurement data being outputted from the external measurement device, and to generate a conversion condition based on a result of measuring the plurality of test images by the sensor and the obtained measurement data, wherein the conversion condition is used to convert a result of measuring by the sensor into a measurement result of an external measurement device.

Further features of the present invention will become apparent from the following description of exemplary embodiments with reference to the attached drawings.

BRIEF DESCRIPTION OF THE DRAWINGS

FIGS. 5A and 5B are views for describing test charts.

FIGS. 6A and 6B are views for describing an improved test chart.

FIG. 7 is a view illustrating measurement results.

FIG. 11 is a view for describing the image processing apparatus.

FIG. 13 is a table illustrating layout rules.

FIG. 14 is a view illustrating test charts.

FIG. 16 is a flowchart illustrating a method of generating a shared test chart.

FIGS. 17A and 17B are views illustrating a user interface.

DESCRIPTION OF THE EMBODIMENTS

First Embodiment

Image Forming Apparatus

Figure 1:
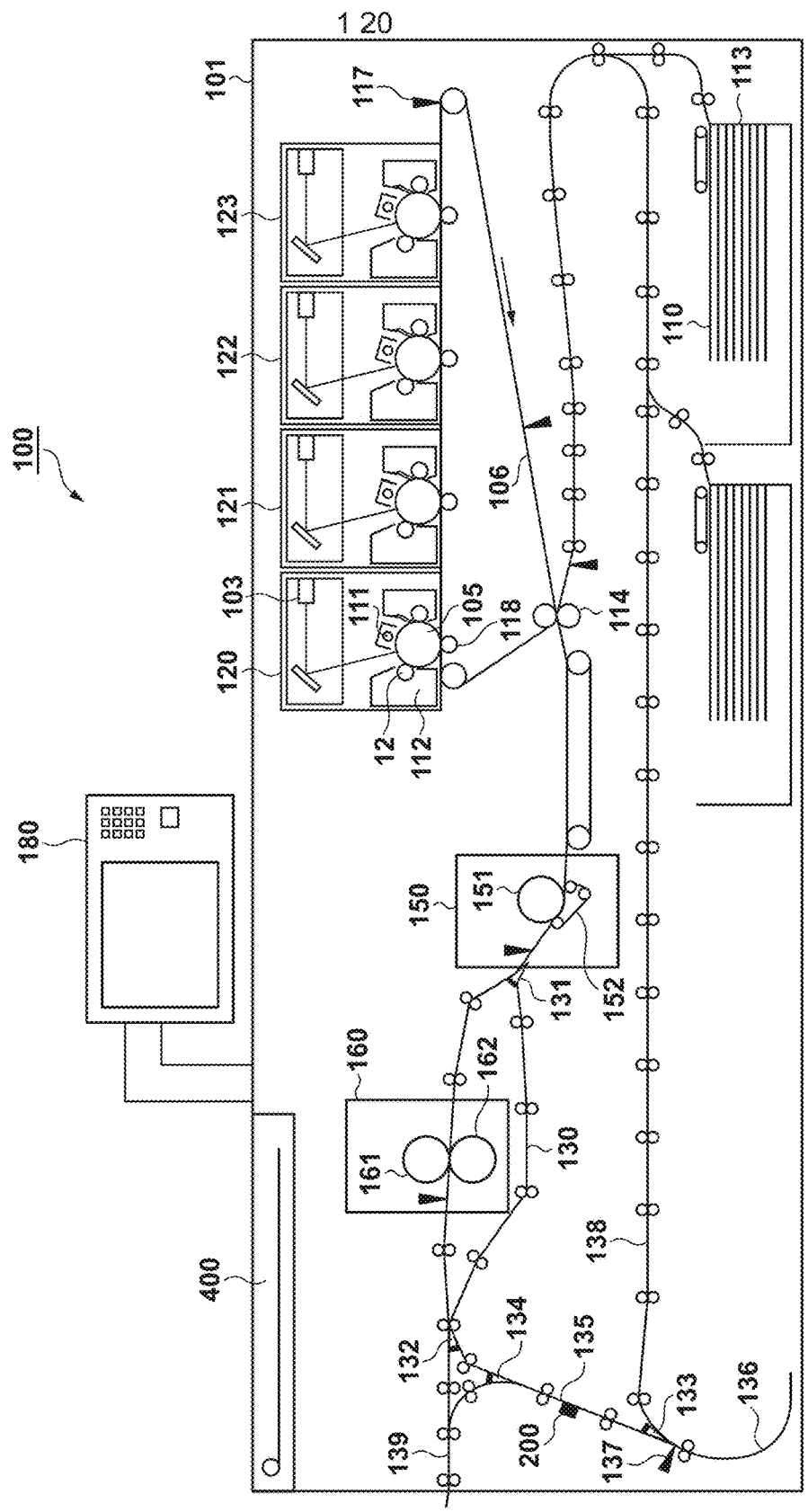
FIG. 1 is an overview cross-sectional view of an image forming apparatus.

An image forming apparatus 100 in FIG. 1 has a printer 101, a reader 400, and an operation unit 180. The printer 101 is a printer engine having four stations 120, 121, 122, and 123 that form an image of each color component. The station 120 is an image forming unit that forms a yellow image. The station 121 is an image forming unit that forms a magenta image. The station 122 is an image forming unit that forms a cyan image. The station 123 is an image forming unit that forms a black image. Since the configuration of each station is the same, the configuration of the station 120 that forms yellow images will be described hereafter.

A photosensitive drum 105 is a photosensitive member having a photosensitive layer. The photosensitive drum 105 functions as an image carrier that carries an electrostatic latent image or a toner image. A charger 111 causes the photosensitive drum 105 to be charged such that an electrical potential of the surface of the photosensitive drum 105 reaches a predetermined electrical potential (charging potential). An exposure apparatus 103 forms an electrostatic latent image on the surface of the photosensitive drum 105 by irradiating onto the photosensitive drum 105 a laser beam controlled based on image data. A developer 112 has an accommodation unit that accommodates a developing agent including toner and a magnetic carrier and has a developing sleeve 12 that is arranged within the accommodation unit and that carries the developing agent and rotates. The developer 112 develops the electrostatic latent image by using the developing agent and forms a toner image. A primary transfer roller 118 transfers the toner image on the photosensitive drum 105 to an intermediate transfer belt 106. The intermediate transfer belt 106 functions as an image carrier that carries the toner image formed by the stations 120, 121, 122, and 123. The intermediate transfer belt 106 conveys the toner image to a secondary transfer roller 114 by rotating. Various conveyance rollers, such as the secondary transfer roller 114, convey a sheet along a conveyance path. Note, the conveyance unit that conveys the sheet is not limited to a roller. The conveyance unit may be, for example, a conveyor belt that conveys a sheet.

In the surroundings of the intermediate transfer belt 106, a density sensor 117, which measures the density of a measurement image (test image) formed on the intermediate transfer belt 106, is arranged. The density sensor 117 is an optical sensor, for example. The density sensor 117 outputs a signal in accordance with an amount of toner adhering to the measurement image formed on the intermediate transfer belt 106. In other words, the density sensor 117 detects the density of the measurement image formed on the intermediate transfer belt 106. The image forming apparatus 100, based on a measurement result of the density sensor 117, controls an image forming condition such that the density of an image formed by the stations 120, 121, 122, and 123 becomes a target density. Here, the image forming condition is an intensity of the laser of the exposure apparatus 103, or the like.

A sheet feeding unit 113 feeds and conveys a sheet 110 such that a timing at which the toner image carried on the intermediate transfer belt 106 reaches the secondary transfer roller 114 matches a timing at which the sheet 110 reaches the secondary transfer roller 114. The secondary transfer roller 114 transfers the toner image carried on the intermediate transfer belt 106 to the sheet 110. A transfer voltage is applied to the secondary transfer roller 114. The sheet 110, after the toner image is transferred thereto, is conveyed to a fixing device 150.

The fixing device 150 is equipped with a fixing roller 151 that has a heater that heats the sheet 110 and a pressure belt 152 that presses the sheet 110 on the fixing roller 151. The fixing device 150 causes the toner image transferred onto the sheet 110 to be fixed on the sheet 110 by applying heat and pressure. Meanwhile, a fixing device 160 is arranged at the downstream side of the fixing device 150 in the direction that the sheet 110 is conveyed. The fixing device 160 is equipped with a fixing roller 161 having a heater that heats the sheet and a pressure roller 162. For example, there are cases in which the fixing device 160 causes a gloss (luster) of the toner image on the sheet 110 to increase and cases in which the fixing device 160 causes an image to be fixed to the sheet 110 when a large amount of heat is necessary for fixation, such as with a thick paper. The sheet 110, after passing through the fixing device 150, is conveyed to the fixing device 160 in such a case.

In a case in which the toner image is fixed onto the sheet 110 of normal paper, thin paper, or the like, the sheet 110, after passing through the fixing device 150, is conveyed along a conveyance path 130 without passing though the fixing device 160. A flapper 131 guides the sheet 110 to the fixing device 160 and guides it to the conveyance path 130.

A flapper 132 is a guiding member that switches whether the sheet 110 is guided to a conveyance path 135 or guided to a conveyance path 139 that communicates with the outside. The sheet 110 conveyed along the conveyance path 135 is conveyed to an inversion unit 136. When an inversion sensor 137 arranged in the conveyance path 135 detects the trailing end of the sheet 110, the conveyance direction of the sheet 110 reverses. A flapper 133 is a guiding member that switches whether the sheet 110 is guided to a conveyance path 138 for a double-sided print or is guided to the conveyance path 135. In a case in which a face down discharge mode is executed, the sheet 110 is conveyed to the conveyance path 135 by the flapper 133 and is discharged from the image forming apparatus 100. A flapper 134 is a guiding member that guides the sheet 110 to the conveyance path 139 in order to discharge it from the image forming apparatus 100. In a case in which a double-sided print mode is selected, the flapper 133 guides the sheet 110 to the conveyance path 138. The sheet 110 is conveyed to the secondary transfer roller 114 again via the conveyance path 138. By this arrangement, an image is formed on the second side of the sheet 110.

An inline sensor (ILS) 200, which measures the measurement image on the sheet 110, is arranged in the conveyance path 135. The ILS 200 is a so-called spectral sensor. Four ILSs 200 may be arranged lining up in a direction perpendicular to the conveyance direction of the sheet 110 for example. By this arrangement, a four-column measurement image is concurrently detected. The ILS 200 is arranged in the conveyance path and measures the measurement image on the sheet.

The operation unit 180 has a display unit that displays information to an operator and an input unit for the operator to input information (such as a number of print sheets or a print mode of an image). The reader 400 has an original platen and a unit having a light source, an optical system, and a charge coupled device (CCD) sensor, and reads an original image placed on the original platen. The reader 400 executes a read operation in a case in which an original is placed on the original platen and a read start button of the operation unit 180 is pressed by the operator. In a case in which the read operation is executed, light irradiated from the light source is reflected by the original placed on the original platen, and the light reflected from the original forms an image on a CCD sensor via an optical system, such as a lens. When the light reflected from the original forms an image on the CCD sensor, read data corresponding to the original is obtained. The read data is configured by data of three color components of red (R), green (G), and blue (B), for example. The reader 400 converts the read data into image data of yellow, magenta, cyan, and black.

Inline Sensor

Figure 2:
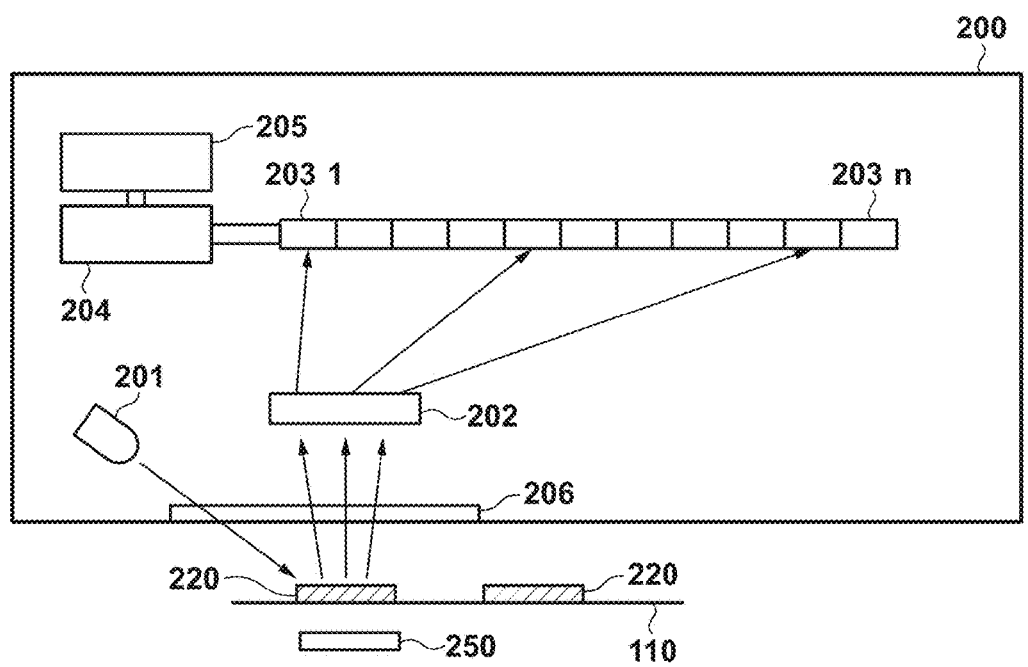
FIG. 2 is a view illustrating an inline sensor.

FIG. 2 illustrates the ILS 200. The ILS 200 is equipped with a white light emitting diode (LED) 201, a diffraction grating 202, a line sensor 203, a calculation unit 204, and a memory 205. The white LED 201 irradiates light on a measurement image 220 on the sheet 110. The diffraction grating 202 disperses light reflecting from the measurement image 220 into each wavelength. The line sensor 203 is equipped with n light receiving elements (n pixels). The calculation unit 204 performs various calculations based on the light intensity value of each pixel of the line sensor 203. The memory 205 saves various data.

The ILS 200 detects light intensity of the light reflected between 380 [nm] to 720 [nm] in intervals of 10 [nm]. In such a case, n is 34. The calculation unit 204 may also have a spectral calculation unit for calculating a spectral reflectance based on a light intensity value of each pixel of the line sensor 203, a Lab calculation unit for calculating a L*a*b* value, and the like, for example. The ILS 200 may also have a lens 206 that focuses light irradiated from the white LED 201 onto the measurement image 220 on the sheet 110 and that focuses light reflected from the measurement image 220 onto the diffraction grating 202.

The ILS 200 has a white reference plate 250. The ILS 200 executes an adjustment of an amount of light of the white LED 201 by using the white reference plate 250. For example, the ILS 200 causes the white LED 201 to emit light in a state in which the sheet 110 is not passing through the measurement position of the ILS 200 and receives, by the line sensor 203, light reflected from the white reference plate 250. The calculation unit 204 adjusts the emission intensity of the white LED 201 so that a light intensity value of a predetermined pixel of the line sensor 203 is a predetermined value.

The calculation unit 204 calculates a spectral reflectance R (λ) of the measurement image based on Equation 1 from a detection result P (λ) of the line sensor 203 corresponding to the light reflected from the measurement image and a detection result W (λ) of the line sensor 203 corresponding to the light reflected from the white reference plate 250.

$$R(\lambda)=P(\lambda)/W(\lambda) \quad (1)$$

The calculation unit 204 calculates a density from the spectral reflectance R (λ). For example, an absolute density may be calculated in accordance with the spectral sensitivity calculation defined by ISO-5/3.

Control System

Figure 3:
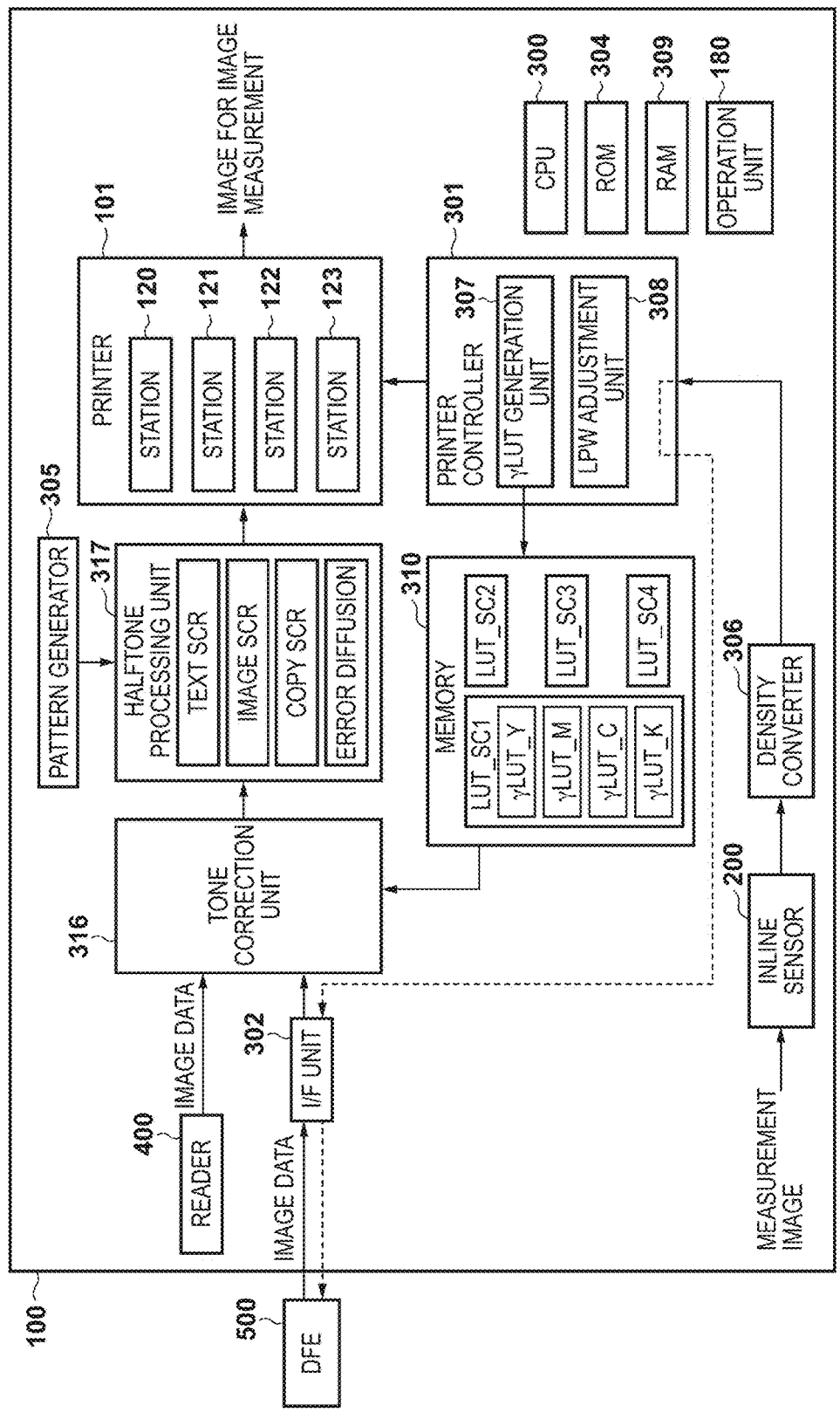
FIG. 3 is a view for describing a function related to image processing in the image forming apparatus.

FIG. 3 illustrates a control system of the image forming apparatus 100. A digital front end (DFE) 500 is connected to the image forming apparatus 100 in this example. The DFE 500 is an image processing apparatus that executes raster image processing, color conversion, or the like.

A central processing unit (CPU) 300 is a control circuit for controlling each unit of the image forming apparatus 100. A ROM 304 is a storage apparatus that stores a control program necessary for executing various adjustments, processes, or the like, that are executed by the CPU 300. A random access memory (RAM) 309 is a system work memory that the CPU 300 uses to operate. An interface (I/F) unit 302 is an interface (communication circuit) connected to the DFE 500 that receives image data (example: bitmap information with attributes) output from the DFE 500. An attribute is information indicating a type of an image object included in image data inputted to the DFE 500. A photograph, a graphic (shape), text (character), or the like, may be an attribute, for example. A tone correction unit 316 executes a tone correction process on the image data input from the reader 400 or the I/F unit 302. In other words, the tone correction unit 316 corrects the image data based on a tone correction condition. The printer 101 forms an image on a sheet based on the image data corrected by the tone correction unit 316. Note, the tone correction unit 316 executes tone correction for image data of yellow, magenta, cyan, and black colors (YMCK), respectively. COPY, meaning a copy, may be attached as an attribute to the image data inputted by the reader 400. The tone correction unit 316 executes a tone correction by referencing a look up table (LUT) associated with an attribute stored in a memory 310. The LUT may also be called a tone correction condition or a tone correction table. A halftone processing unit 317 also executes halftone processing (halftone processing) in accordance with an attribute. The reason that halftone processing is changed in accordance with an object is as follows. Characters printed on the sheet 110 not only have straight lines but also curves. For this reason, outlines of the characters are not smoothly reproduced if the number of lines of a screen is not high. Meanwhile, when halftoning is performed on a photograph using a screen of a high number of lines, there is the possibility that an image of a uniform density cannot be reproduced. For this reason, the tone correction unit 316 executes halftone processing suitable to the object and converts the image data based on the LUT corresponding to the halftone processing.

The reason that tone correction is necessary is as follows. When the state of the developing agent within the developer 112 or the temperature or humidity within the interior of the image forming apparatus 100 changes, a density characteristic (tone characteristic) of an image formed by the image forming apparatus 100 fluctuates. The tone correction unit 316 converts an input value (image signal value) of image data into a signal value in order for the printer 101 to form an image of a target density such that a density characteristic (tone characteristic) of the image formed by the printer 101 becomes an ideal density characteristic.

The tone correction unit 316 reads from the memory 310 a tone correction table (γLUT) in accordance with an attribute or screen and converts the image data based on the γLUT. LUT_SC1 is a tone correction table corresponding to an image screen. LUT_SC2 is a tone correction table corresponding to a text screen. LUT_SC3 is a tone correction table corresponding to a COPY screen. Tone correction table LUT_SC4 is a tone correction table corresponding to an error diffusion method. LUT_SC1, LUT_SC2, LUT_SC3, and LUT_SC4 correspond to conversion conditions for converting image data. A γLUT generation unit 307 is a first calibration unit for updating these γLUTs by executing a calibration operation A. By this arrangement, even if the state of the developing agent, the internal temperature, or the humidity changes, a density characteristic of an image is maintained at an ideal characteristic. A printer controller 301 including the γLUT generation unit 307 may also function as a first generation unit. A first generation unit causes a sheet to be conveyed by controlling the conveyance unit and causes a first pattern image including plurality of first measurement images to be formed on the sheet by controlling the image forming unit. Additionally, the first generation unit measures the first pattern images on the sheet by controlling the measurement unit, converts the measurement result of the first pattern images into first measurement data by the conversion unit, and generates a tone correction condition based on the first measurement data.

The tone correction unit 316 may be realized by an integrated circuit, such as an application specific integrated circuit (ASIC), and may also be realized by the CPU 300 executing a program. Also, the tone correction unit 316 may convert the image data based on a tone correction table and may also convert the image data based on a conversion formula.

The halftone processing unit 317 applies halftoning, which is suitable for a type (attribute) of an image, on image data converted by the tone correction unit 316. The halftone processing unit 317, based on an image screen, converts image data relating to an image and image data relating to a graphic so that a photograph or a shape becomes an image with excellent tone characteristics. The halftone processing unit 317, based on a text screen, converts image data relating to text so that a character is clearly printed. The halftone processing unit 317, in a case in which the operator selects an error diffusion method, converts image data based on the error diffusion method. Here, the operator selects the error diffusion method in order to suppress moire in a case in which moire occurs in an image of a high resolution for example. The halftone processing unit 317, based on a COPY screen, converts image data of an original that the reader 400 read.

The image data to which screening was applied by the halftone processing unit 317 is output to the printer 101. For example, the halftone processing unit 317 outputs yellow image data to the station 120. The printer 101 forms onto the sheet 110 an image based on the image data inputted from the halftone processing unit 317.

A pattern generator 305 outputs the measurement image data used in the calibration operation A. The halftone processing unit 317 executes halftoning on the measurement image data outputted from the pattern generator 305. An image screen is applied to the measurement image data in order to update LUT_SC1, which is a tone correction table corresponding to the image screen. A text screen is applied to the measurement image data in order to update LUT_SC2, which is a tone correction table corresponding to the text screen. A COPY screen is applied to the measurement image data in order to update LUT_SC3, which is a tone correction table corresponding to the COPY screen. An error diffusion is applied to the measurement image data in order to update LUT_SC4, which is a tone correction table corresponding to the error diffusion. The measurement image data, after halftoning is applied thereto, is transferred to the printer 101. The printer 101 forms onto the sheet 110 a measurement image based on the measurement image data transferred from the halftone processing unit 317. The CPU 300 conveys the sheet 110, after the measurement image is formed thereon, in the direction of the ILS 200, and causes the ILS 200 to measure the measurement image on the sheet 110. The ILS 200 calculates a spectral reflectance of the measurement image 220 by the calculation unit 204 and outputs this to a density converter 306.

The density converter 306 converts a measurement result of a yellow, magenta, and cyan (YMC) measurement image into a density value by using a statusA filter. The density converter 306 converts a measurement result of a black (K) measurement image into a density value by using a visual filter. The statusA filter and the visual filter are arithmetic methods specified by ISO-5/3. The printer controller 301 controls an image forming condition based on the measurement result (density value) converted by the density converter 306 and generates a tone correction table. The printer controller 301 has an LPW adjustment unit 308 that adjusts the intensity of the laser of the exposure apparatus 103 and the γLUT generation unit 307 for generating a tone correction table for example. The LPW adjustment unit 308 determines the intensity of the laser so that the maximum value of the density of the measurement image is a target maximum density. The γLUT generation unit 307 generates a tone correction table (γLUT) so that the tone characteristic of the measurement image is an ideal tone characteristic. Note, the measurement image is formed in every color and in every screen.

Figure 4:
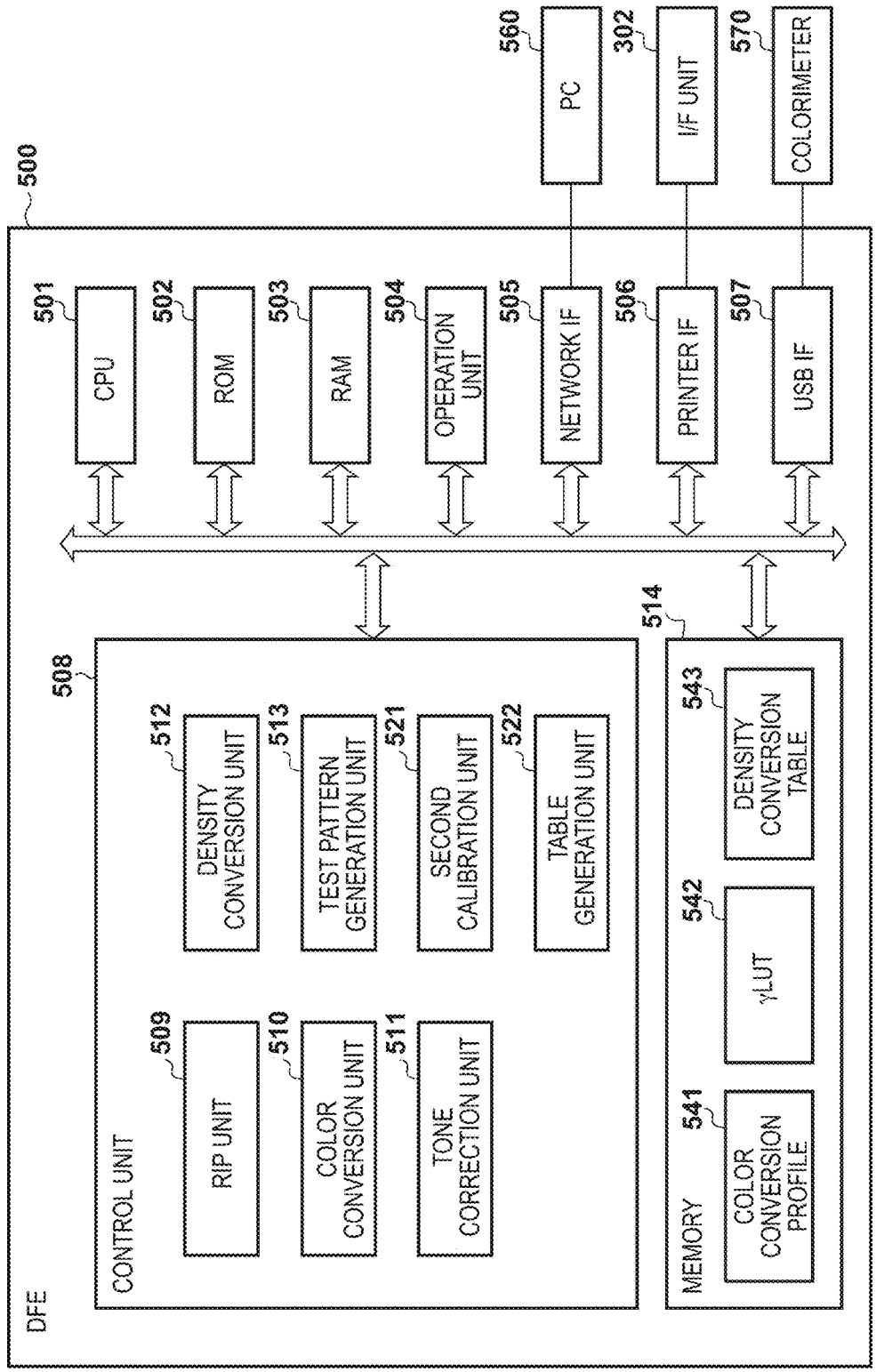
FIG. 4 is a view for describing the image processing apparatus.

FIG. 4 illustrates the DFE 500. A CPU 501 controls each unit of the DFE 500 by executing a control program stored in a read only memory (ROM) 502. The ROM 502 and a RAM 503 are storage apparatuses, such as memories. An operation unit 504 includes an input apparatus for inputting instructions (example: execution instructions for a calibration operation B) to the DFE 500, a display apparatus for displaying information, or the like. A network I/F 505 is a communication circuit for communicating with a personal computer (PC), and the like. The CPU 501 receives image data and an output condition from a PC 560 via the network I/F 505. The output condition includes the type of the sheet 110, and the like, for example. The CPU 501 transfers the image data and the output condition to a control unit 508.

A raster image processing (RIP) unit 509 of the control unit 508 analyzes input image data, determines the attribute of each object, and converts the data into bitmap information. The image data that was converted into bitmap information is input to a color conversion unit 510. The color conversion unit 510 executes color conversion by using a color conversion profile 541 corresponding to an output format (sRGB or Adobe RGB). The color conversion profile 541 is one type of a conversion table. The color-converted image data is input to a tone correction unit 511. The tone correction unit 511 corrects the tone characteristic of the image data by using a tone correction table (γLUT 542) in accordance with the output condition (type of sheet) and generates bitmap data with attributes. The CPU 501 transmits the bitmap data with attributes to the I/F unit 302 via a printer IF 506.

A second calibration unit 521 executes a DFE calibration. The DFE calibration is a process for generating or updating the γLUT 542 so that a target tone defined in advance for every type of sheet is achieved. For example, the second calibration unit 521 causes a test pattern generation unit 513 to generate measurement image data and transmits the measurement image data to the I/F unit 302. By this arrangement, the image forming apparatus 100 forms a measurement image on the sheet 110. A sheet 110 on which the measurement image is formed may be called a test chart. The operator causes a commercial colorimeter 570 connected to a universal serial bus (USB) I/F 507 to read the test chart. The colorimeter 570 is also an image sensor. The second calibration unit 521 generates the γLUT 542 for each type of sheet by using colorimetric data obtained by the colorimeter 570, measurement image data, and a target tone for each type of sheet. In other words, the γLUT 542 for each type of sheet is generated so that a target tone is realized. For example, a γLUT for coated paper, a γLUT for normal paper, a γLUT for thick paper, and a γLUT for thin paper are generated. The second calibration unit 521 stores the generated γLUT 542 to a memory 514 in association with the type of sheet.

A test chart for the calibration operation B may be read by the ILS 200. In such a case, however, a density converter 512 converts a measurement result of the ILS 200 input through the printer I/F 506 into a measurement result of the colorimeter 570. By this arrangement, despite the ILS 200 being used, a measurement result ends up being as if the colorimeter 570 was used. The reason that such conversion processing is necessary is that a target tone is being determined by using the colorimeter 570. It is thought that the operator desires to use the colorimeter 570 in accordance with their personal preference. On the other hand, connecting the colorimeter 570 to the DFE 500 every time the calibration operation B is executed, and manually scanning the DFE 500 may feel cumbersome for the operator. Accordingly, the density converter 512 is arranged so that the ILS 200 can be used in place of the colorimeter 570. Note, a density conversion table 543 that the density converter 512 uses depends on a reading characteristic of the ILS 200 and a reading characteristic of the colorimeter 570. For this reason, a table generation unit 522 generates the density conversion table 543 in accordance with the colorimeter 570. When instructed by the CPU 501 to generate the density conversion table 543, the table generation unit 522 causes the test pattern generation unit 513 to output measurement image data. The measurement image data is output to the I/F unit 302 via the printer IF 506. The image forming apparatus 100 generates a test chart in order to generate the density conversion table 543. The ILS 200 measures the measurement image on the test chart. The measurement result is density-converted by the density converter 306 and is transmitted to the DFE 500 through the I/F unit 302. Meanwhile, the test chart is also measured by the colorimeter 570. In this way, so that the measurement result of the ILS 200 matches with the measurement result of the colorimeter 570, the table generation unit 522 generates the density conversion table 543 for converting the measurement result of the ILS 200 and sets it to the density converter 512. In this way, the table generation unit 522 functions as a second generation unit. The second generation unit causes a sheet to be conveyed by controlling the conveyance unit and causes a second pattern image including a plurality of second measurement images to be formed on the sheet by the image forming unit. Furthermore, the second generation unit causes the second pattern image on the sheet to be measured by controlling the measurement unit. Additionally, the second generation unit obtains second measurement data corresponding to the measurement result for the second pattern image on the sheet outputted from the external measurement device. In addition, the second generation unit generates a conversion condition based on the second measurement data and the measurement result of the second pattern image by the measurement unit.

Test Chart

FIG. 5A illustrates a test chart 600a used in the calibration operation A. A measurement image 220a that FIG. 5A illustrates is arranged in the order of cyan, magenta, yellow, and black, in order from the left. Note, an "a" is attached to the end of configuration elements (objects) of the test chart for the ILS 200. According to FIG. 5A, a plurality of measurement images 220a are arranged in accordance with measurement rules of the ILS 200. The measurement image 220a may be called a test patch or a test pattern. The plurality of measurement images 220a are formed for each of cyan, magenta, yellow, and black colors (CMYK) on one test chart 600a. In a case in which there are four types of halftoning, four sheets are necessary. In other words, one test chart 600a is generated for each type of halftoning. A formation position of the measurement image 220a is determined in accordance with the measurement position of the ILS 200. A cyan measurement image group is formed on the test chart 600a such that the ILS 200 for cyan can be measured. A magenta measurement image group is formed on the test chart 600a such that the ILS 200 for magenta can be measured. A yellow measurement image group is formed on the test chart 600a such that the ILS 200 for yellow can be measured. A black measurement image group is formed on the test chart 600a such that the ILS 200 for black can be measured.

Also, a leading end margin 681a is arranged at a leading end in the conveyance direction of the test chart 600a. A position bar 682a indicates a start of the measurement image group. In other words, the position bar 682a is a trigger bar for causing the ILS 200 to start measurement of the measurement image group. Also, a trailing end margin 689a is arranged at a trailing end in the conveyance direction of the test chart 600a.

FIG. 5B indicates a test chart 600b for the colorimeter 570. A measurement image 220b that FIG. 5B illustrates is arranged in the order of cyan, magenta, yellow, and black in order from the left. Note, a "b" is attached to the end of configuration elements of the test chart for the colorimeter 570. A leading end margin 681b, a position bar 682b, or a trailing end margin 689b are necessary in the test chart 600b for the colorimeter 570. Furthermore, it is defined in measurement rules of the colorimeter 570 that it is necessary to arrange a black separator 684 or a white separator 685 between two adjacent measurement images 220b. When the colorimeter 570 detects the black separator 684 or the white separator 685, it starts a measurement of the next measurement image 220b. The separators 684 and 685 function as markers for specifying a measurement position. Alternatively, the separators 684 and 685 function as markers for determining a measurement timing. Note, since the formation positions of each measurement image 220a are known beforehand in the ILS 200, the separators 684 and 685 are unnecessary. Also, although the sizes of the measurement images 220a for the ILS 200 may also be variable sizes, such as A mm, B mm, and C mm, the sizes of the measurement images 220b for the colorimeter 570 must be fixed at A mm. Here, the size is the length of the measurement image 220a in the reading direction.

In this way, twice the number of test chart sheets are necessary in order to generate the density conversion table 543 because the test chart 600a for the ILS 200 and the test chart 600b for the colorimeter 570 are different. Accordingly, the present embodiment provides the image forming apparatus 100 that is capable of reducing the number of sheets 110 on which a measurement image is formed.

Generation of an accurate density conversion table is difficult if the ILS 200 and the colorimeter 570 do not read measurement images of the same density. The measurement images 220a for the ILS 200 and the measurement images 220b for the colorimeter 570 are, however, physically formed on separate sheets. For this reason, there is a possibility that the densities of the two measurement images 220a and 220b, which should have the same densities, will be different. In other words, a measurement result of the ILS 200 and a measurement result of the colorimeter 570 will be influenced by a variation in the whiteness level or grammage of the two sheets. Accordingly, the present embodiment provides a test chart by which it is possible to decrease the number of test chart sheets and also to improve the accuracy of the density conversion table 543 by the ILS 200 and the colorimeter 570 measuring the same test images on the same test charts.

Improved Test Chart

FIG. 6A and FIG. 6B illustrate an improved test chart 600ab. The test chart 600ab is a test chart shared by the ILS 200 and the colorimeter 570. Note that the same reference numerals are attached to the previously described configuration elements. A reading direction 695a of the ILS 200 is indicated in FIG. 6A. A reading direction 695b of the colorimeter 570 is indicated in FIG. 6B. The reading direction 695a and the reading direction 695b differ in direction from each other and in this example are perpendicular. In this way, a plurality of measurement images 220ab are arranged in the reading direction 695a to satisfy the measurement rules of the ILS 200. Also, the plurality of measurement images 220ab are arranged in the reading direction 695b to satisfy the measurement rules of the colorimeter 570. Consequently, the same test chart 600ab can be shared by the ILS 200 and the colorimeter 570.

Each arrangement of the measurement image 220ab, the leading end margin 681a, the position bar 682a, and the trailing end margin 689a for the ILS 200 in FIG. 6A are as described using FIG. 5A. Accordingly, the arrangement of these objects for the colorimeter 570 are described in detail hereafter.

As FIG. 6A and FIG. 6B illustrate, the colorimeter 570 reads the leading end margin 681b, the position bar 682a, the white separator 685, the cyan measurement image 220ab, and the black separator 684 or the white separator 685 in order while moving left to right. Furthermore, the colorimeter 570 reads the black separator 684 or the white separator 685, the magenta measurement image 220ab, and the black separator 684 or the white separator 685 in order while moving left to right. Furthermore, the colorimeter 570 reads the black separator 684 or the white separator 685, the yellow measurement image 220ab, and the black separator 684 or the white separator 685 in order while moving left to right. Furthermore, the colorimeter 570 reads the black separator 684 or the white separator 685, the black measurement image 220ab, the black separator 684 or the white separator 685, and the trailing end margin 689b in order while moving left to right. When the colorimeter 570 has read the first row of the CMYK measurement image 220ab, it then reads the second row CMYK measurement image 220ab. The colorimeter 570 executes such read processing in order until the final row.

As FIG. 6A illustrates, the leading end margin 681b is arranged at the left end of the test chart 600ab of an A4 size. The width of the main-scanning direction (hereafter, referred to as a main-scanning width) of the leading end margin 681b is 30 mm, for example. Note that the main-scanning direction corresponds to a direction that is perpendicular to the conveyance direction in which the image forming apparatus conveys the test chart. Additionally, the main-scanning direction is parallel to the reading direction 695b in FIG. 6A and FIG. 6B. Furthermore, the position bar 682b is arranged to be a trigger for causing the colorimeter 570 to start a measurement at the left side of the cyan measurement image 220ab. The main-scanning width of the position bar 682b is 22 mm, for example. The white separator 685 is arranged between the position bar 682 and the cyan measurement image 220ab. In other words, the white separator 685 is arranged neighboring the left of the cyan measurement image 220ab. The main-scanning width of the white separator 685 is 2 mm. The main-scanning width of the cyan measurement image 220ab is 22 mm. The black separator 684 or the white separator 685 is arranged neighboring the right of the cyan measurement image 220ab. One of these separators is selected depending on the tone (signal value) of the cyan measurement image 220ab. For example, the black separator 684 is selected at the measurement image 220ab of a tone that is less than a predetermined threshold. The white separator 685 is selected at the measurement image 220ab of a tone that is greater than or equal to the predetermined threshold. The main-scanning width of the black separator 684 and the white separator 685 is 2 mm. The colorimeter 570 ends the measurement of the measurement image 220ab when it detects the separator neighboring the right of the measurement image 220ab.

A solid white portion 687 is arranged between the separator neighboring the right of the cyan measurement image 220ab and the separator neighboring the left of magenta measurement image 220ab. The main-scanning width of the solid white portion 687 is 22 mm. The solid white portion 687 is not read by the ILS 200 but is read by the colorimeter 570. This is because the solid white portion 687 is arranged in order to satisfy the measurement rules of the colorimeter 570. Also, in accordance with the measurement rules of the colorimeter 570, since the solid white portion 687 is the same measurement target as the measurement image 220ab, the size of the solid white portion 687 matches the size of the measurement image 220ab. By this arrangement, the size uniformity requirement of the measurement image is satisfied.

When the colorimeter 570 reads the black separator 684 or the white separator 685 following the solid white portion 687, it starts a measurement of the magenta measurement image 220ab. The black separator 684 or the white separator 685 according to the tone of the measurement image 220ab is arranged neighboring the left and right of the magenta measurement image 220ab. When the colorimeter 570 detects the black separator 684 or the white separator 685 neighboring the right of the measurement image 220ab, it ends the measurement of the magenta measurement image 220ab. The solid white portion 687 is also arranged between the magenta measurement image 220ab and the yellow measurement image 220ab.

When the colorimeter 570 reads the black separator 684 or the white separator 685 following the solid white portion 687, it starts a measurement of the yellow measurement image 220ab. The black separator 684 or the white separator 685 according to the tone of the measurement image 220ab is arranged neighboring the left and right of the yellow measurement image 220ab. When the colorimeter 570 detects the black separator 684 or the white separator 685 neighboring the right of the measurement image 220ab, it ends the measurement of the yellow measurement image 220ab. The solid white portion 687 is also arranged between the yellow measurement image 220ab and the black measurement image 220ab.

When the colorimeter 570 reads the black separator 684 or the white separator 685 following the solid white portion 687, it starts a measurement of the black measurement image 220ab. The black separator 684 or the white separator 685 according to the tone of the measurement image 220ab is arranged neighboring the left and right of the black measurement image 220ab. When the colorimeter 570 detects the black separator 684 or the white separator 685 neighboring the right of the measurement image 220ab, it ends the measurement of the black measurement image 220ab. Note, the trailing end margin 689b is arranged neighboring the right of the black separator 684 or the white separator 685 that is neighboring the right of the measurement image 220*ab*. The main-scanning width of the trailing end margin 689*b* is 52 mm, for example.

FIG. 7 illustrates one example of results (density) of measuring the test chart 600*ab* by the colorimeter 570. Note, sub-scan addresses indicate row numbers in the test chart 600*ab*. Test images are arranged in order of a sub-scan address number in the test chart 600*ab*. The test images are arranged in parallel with the conveyance direction of the sheet. W indicates a result of measuring the solid white portion 687. The result of measuring the solid white portion 687 is converted to a density via a Visual filter (for black). Although the density of the solid white portion 687 is unnecessary for the image forming apparatus 100 or the DFE 500, it may be useful when the operator finds a measurement error of the colorimeter 570.

Flowchart

Figure 8:
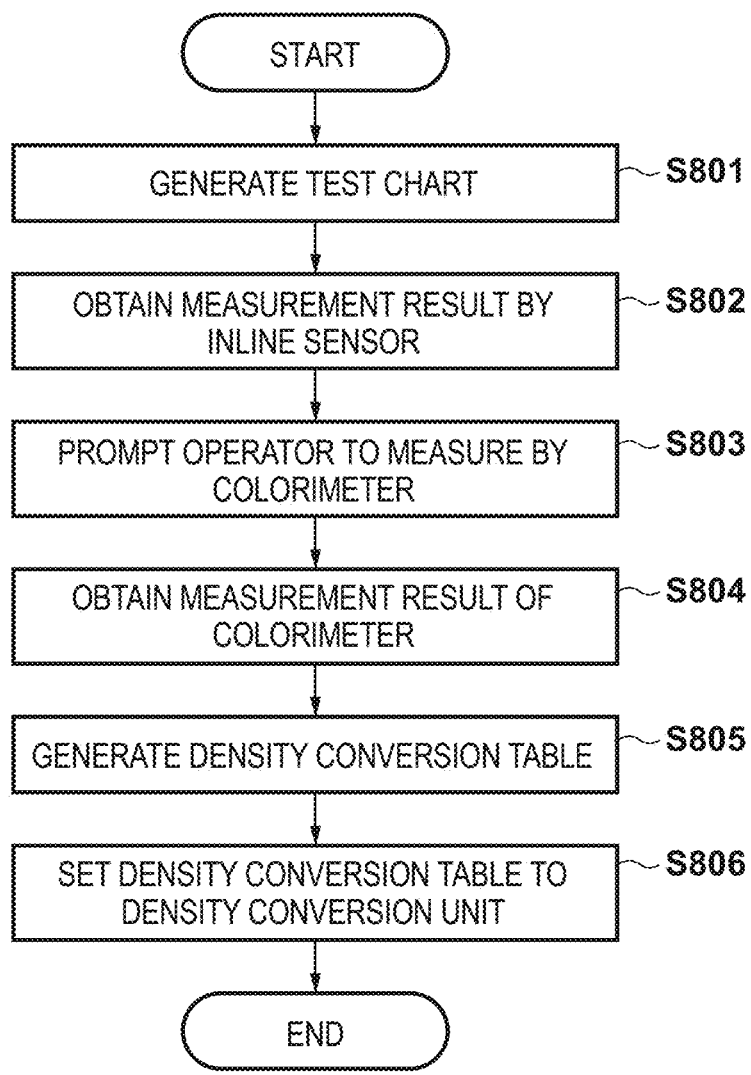
FIG. 8 is a flowchart illustrating a method of generating a density conversion table.

FIG. 8 is a flowchart illustrating a method of generating the density conversion table 543. The generation method is executed by the table generation unit 522. When the CPU 501 accepts an instruction for generating the density conversion table 543 through the operation unit 504, the CPU 501 activates the table generation unit 522. As described above, the table generation unit 522 may be realized by the CPU 501 executing the control program.

In step S801, the table generation unit 522 generates the test chart 600*ab* using the image forming apparatus 100. For example, the table generation unit 522 causes the test pattern generation unit 513 to generate image data for the test chart 600*ab*. The table generation unit 522 outputs image data, a print instruction, and a measurement instruction to the I/F unit 302 through the printer IF 506. The CPU 300 causes the tone correction unit 316 and the halftone processing unit 317 to execute image processing on the image data in accordance with a print instruction and causes the printer 101 to output the result. The printer 101 forms onto the sheet 110 an image in accordance with the image data output from the halftone processing unit 317. By this arrangement, the test chart 600*ab* is generated.

In step S802, the table generation unit 522 obtains the result of measuring the test chart 600*ab* by the ILS 200. The CPU 300 controls the flapper 132 in accordance with a measurement instruction and thereby guides the test chart 600*ab* to the conveyance path 135. The ILS 200 measures the test chart 600*ab* in accordance with the measurement instruction from the CPU 300 and outputs the measurement result to the density converter 306. The density converter 306 converts the measurement result (spectral reflectance) into a density and outputs it to the printer controller 301. The printer controller 301 transfers the measurement result (density) to the DFE 500 via the I/F unit 302 in accordance with a transfer instruction from the CPU 300. When the CPU 501 receives the measurement result (density), it transfers it to the table generation unit 522. The table generation unit 522 stores the measurement result (density) by the ILS 200 in the RAM 503. The CPU 300 controls the flappers 133 and 134 and discharges the test chart 600*ab* read by the ILS 200 to the outside of the image forming apparatus 100.

In step S803, the table generation unit 522 prompts the operator to take a measurement by the colorimeter 570 by outputting a message to the operation unit 504. Guidance information, and the like, indicating a movement (scanning) direction of the colorimeter 570 with respect to the test chart 600*ab*, and the like, is included in the message. The operator moves the colorimeter 570 on the test chart 600*ab* in accordance with the guidance information. The colorimeter 570 measures the test chart 600*ab* in accordance with the measurement rules and outputs the measurement result to the USB IF 507. Note, the processing for converting from the measurement result (spectral reflectance) into a measurement result (density) may be executed by the colorimeter 570 and may be executed by the table generation unit 522.

In step S804, the table generation unit 522 obtains the result (density) of measuring the test chart 600*ab* by the colorimeter 570. The table generation unit 522 receives the measurement result (density) from the colorimeter 570 via the USB IF 507 and stores it in the RAM 503.

In step S805, the table generation unit 522 generates the density conversion table 543 by reading the measurement result (density) of the colorimeter 570 and the measurement result (density) of the ILS 200 from the RAM 503 and saves it in the memory 514. The density conversion table 543 is a table for converting the measurement result (density) of the ILS 200 into a measurement result (density) of the colorimeter 570, and generates one for each of C, M, Y, and K.

In step S806, the table generation unit 522 sets the density conversion table 543 stored in the memory 514 to the density converter 512. As a result, it becomes possible for the calibration operation to be executed using the ILS 200, even if a calibration is performed assuming that the colorimeter 570 was used. Calibration operation B is representative of such a calibration operation. Note, if a calibration operation is performed assuming the colorimeter 570 was used, the present embodiment can be applied even if it is a calibration operation executed within the image forming apparatus 100. Here, colorimeter measurement rules which are a de facto standard in the market is used for the colorimeter 570. The present embodiment can, however, be applied even with another colorimeter that the operator desires to connect to the DFE 500. In such a case, the arrangement of the measurement image 220*ab* on the test chart 600*ab* need only satisfy both the measurement rules of the ILS 200 and the measurement rules of the colorimeter 570. In other words, it is sufficient that, for the test chart 600*ab*, an arrangement of the measurement image 220*ab* in a first direction satisfies the measurement rules of the ILS 200 and an arrangement of the measurement image 220*ab* in a second direction satisfies the measurement rules of the colorimeter 570.

Incidentally, the test chart used by the calibration operation B may be the test chart 600*a* illustrated in FIG. 5A and may be the test chart 600*ab* illustrated in FIG. 6A. This is because whichever of these is used, the density converter 512 can convert a measurement result of the ILS 200 into a measurement result of the colorimeter 570.

In this way, by virtue of this embodiment, a test chart of a layout suitable for a device used for measuring a measurement image can be printed. Also, by virtue of this embodiment, the image forming apparatus 100 and the DFE 500, which are capable of reducing the number of sheets on which a measurement image is formed, are provided. Also, by virtue of this embodiment, accuracy of a generation of the density conversion table 543 for converting a measurement result of the ILS 200 into a measurement result of the colorimeter 570 is improved. This is because it becomes possible for the ILS 200 and the colorimeter 570 to measure the same measurement image on the same sheet in spite of the fact that their measurement rules differ from each other.

Supplement

Changes may be made so long as an arrangement of an object, such as the measurement image 220*ab* or the separators 684 and 685 in the test chart 600*ab*, satisfies the measurement rules of the ILS 200 and the measurement rules of the colorimeter 570.

Figure 9:
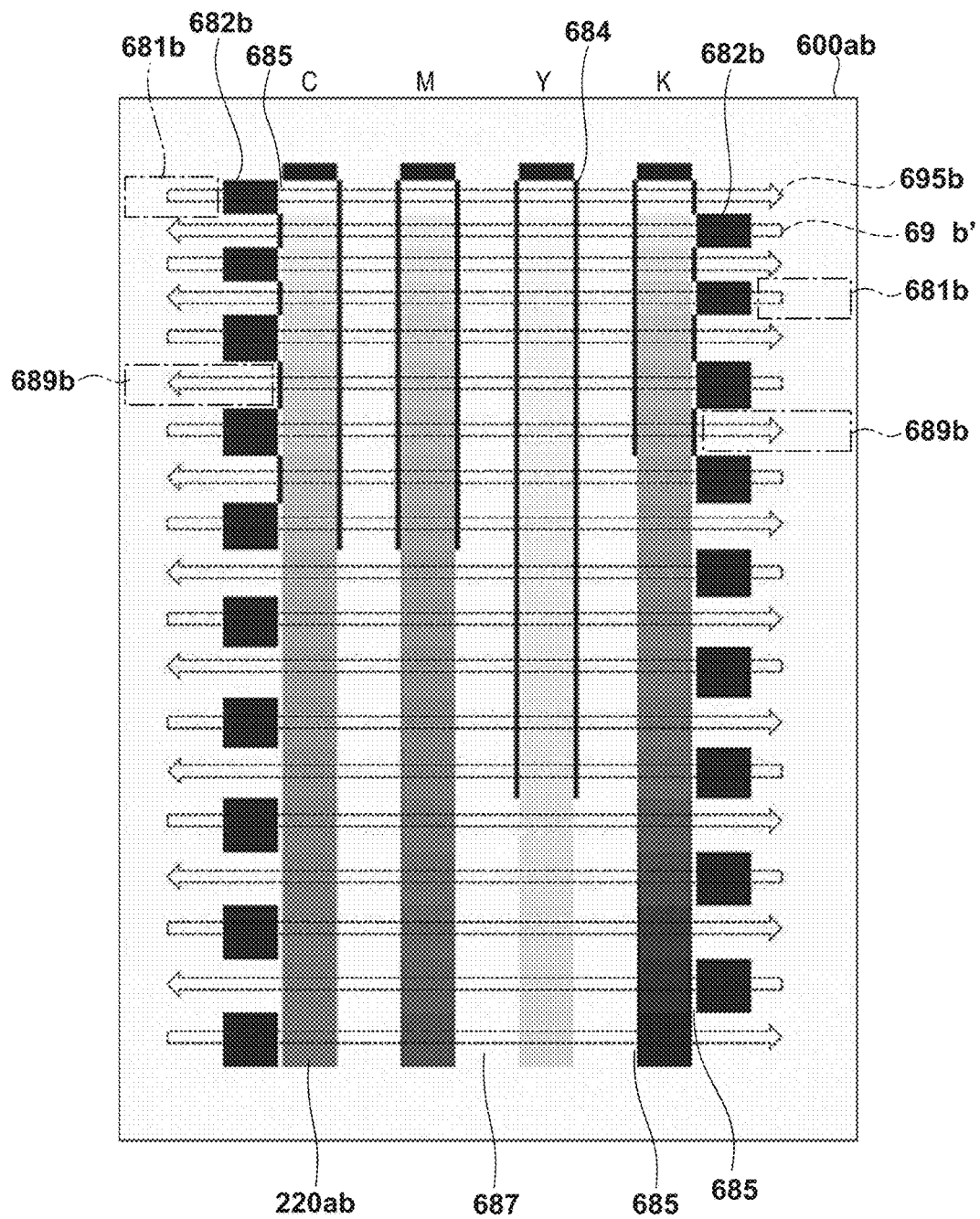
FIG. 9 is a view for describing an improved test chart.

FIG. 9 illustrates the test chart 600*ab* that uses another arrangement. A first image group of n columns (example: n=4) and a second image group of m rows (example: m=19) are arranged in the test chart 600*ab* as described above. Note, the measurement image 220*a* that configures the first image group and the measurement image 220*a* that configures the second image group are the same image. In FIG. 9, the colorimeter 570 measures the second image group of row i while scanning in the second direction (the reading direction 695*b*) and measures the second image group of row i+1 while scanning in the opposite direction to the second direction (the reading direction 695*b'*). Although the leading end margin 681*b* is arranged at the left end in an odd numbered row, the leading end margin 681*b* is arranged at the right end in an even numbered row as FIG. 9 illustrates. This is because the colorimeter 570 moves in the direction from the right end to the left end for an even numbered row. Similarly, while the trailing end margin 689*b* is arranged at the right end in an odd numbered row, the trailing end margin 689*b* is arranged at the left end in an even numbered row. Similarly, although the position bar 682*b* is arranged at the left end in odd numbered row, the position bar 682*b* is arranged at the right end in an even numbered row. Note, the white separator 685 is arranged between the measurement image 220*ab* and the position bar 682*b*. Although the white separator 685 is arranged neighboring the right of the position bar 682*b* in an odd numbered row, a white separator 685 is arranged neighboring the left of the position bar 682*b* in an even numbered row.

In this way, work efficiency of the operator improves by changing the scanning direction of the colorimeter 570 every other row. For example, with the test chart 600*ab* illustrated in FIG. 6B, work for returning the colorimeter 570 from the right end of the test chart 600*ab* to the left end occurs every time one row is read. Such work for returning is unnecessary in the test chart 600*ab* illustrated in FIG. 9.

According to FIG. 4, although the density converter 512 is arranged within the DFE 500, it may be arranged on the image forming apparatus 100 side. For example, the density converter 512 may be implemented within the printer controller 301 and may be implemented in a control program of the CPU 300. The density conversion table 543 of the density converter 512 may be stored in the memory 310. Also, the table generation unit 522 may be implemented within the printer controller 301 and may be implemented in a control program that the CPU 300 executes. A function of the test pattern generation unit 513 may be implemented in the pattern generator 305. Also, the USB IF 507 for connecting the colorimeter 570 is arranged in the image forming apparatus 100. Also, a function of the operation unit 504 is implemented in the operation unit 180. Such a density conversion function or a function for generating the density conversion table 543 may be implemented in the image forming apparatus 100. Note, a configuration may be such that the colorimeter 570 remains connected to the DFE 500, and the DFE 500 transfers the measurement result to the test pattern generation unit 513 within the image forming apparatus 100.

Although a calibration operation in which the optical density is used is assumed as described above, the above described embodiment may be applied to color management (Verification) for measuring a Lab value specified by CIE1976. In such color management, the test chart 600*ab* for color management is measured by using the colorimeter 570. Here, a difference between the test chart 600*ab* for density and the test chart 600*ab* for color management is that the former manages the measurement image 220*ab* with tones but the latter manages the measurement image 220*b* with Lab values. In other words, the test pattern generation unit 513 generates image data represented by Lab values and then outputs it to the image forming apparatus 100.

Figure 10:
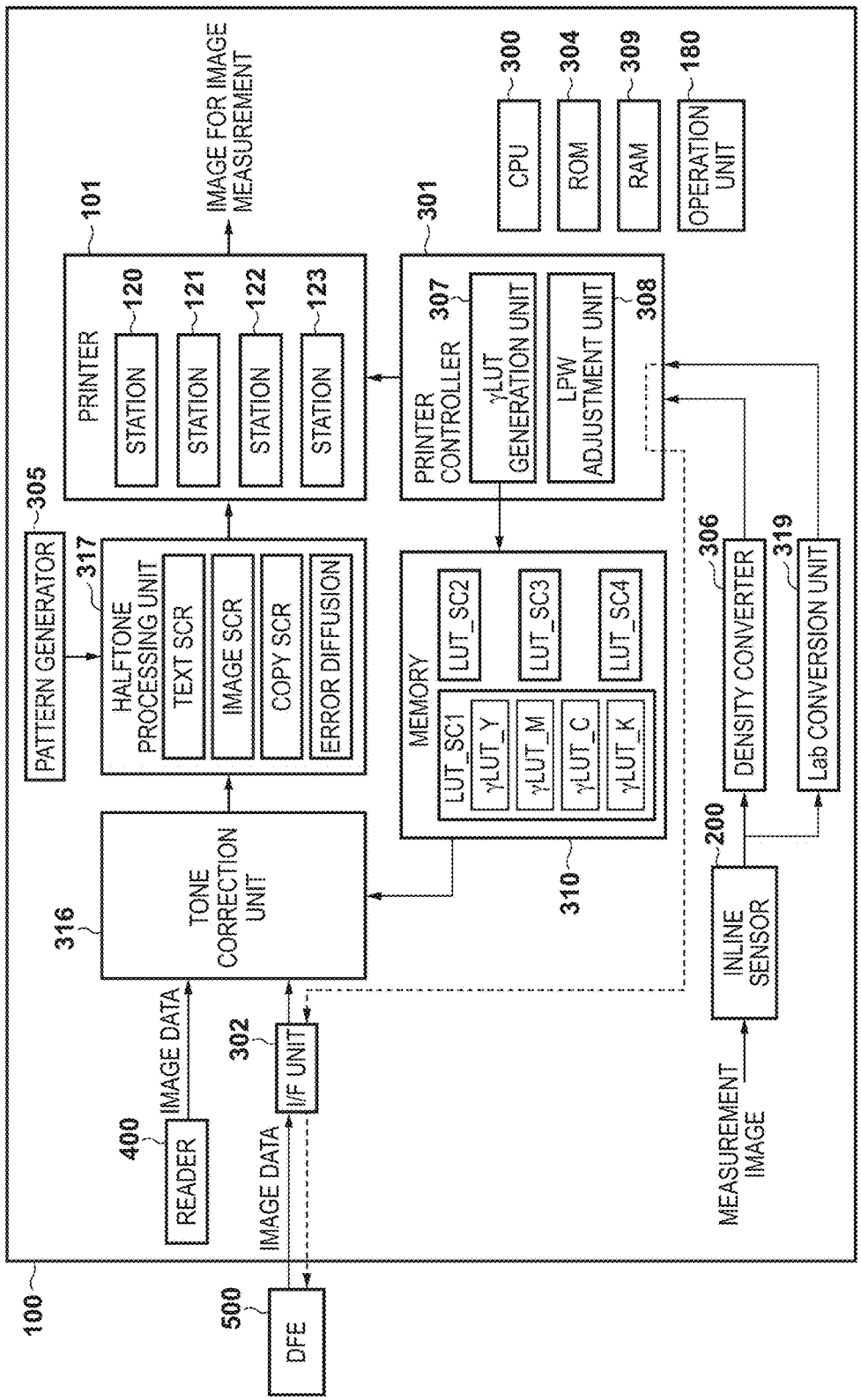
FIG. 10 is a view for describing a function related to image processing in the image forming apparatus.

FIG. 10 illustrates the image forming apparatus 100 on which a Lab conversion unit 319 is mounted. The Lab conversion unit 319 converts a measurement result (spectral reflectance) of the ILS 200 into a Lab value and outputs it to the printer controller 301. The printer controller 301 transmits the measurement result (Lab) to the DFE 500 via the I/F unit 302.

FIG. 11 illustrates the DFE 500 that comprises a Lab conversion unit 515. The Lab conversion unit 515 converts a measurement result (Lab value) of the ILS 200 into a measurement result (Lab value) of the colorimeter 570 by using a Lab conversion table generated in advance by the table generation unit 522. By this arrangement, it becomes possible to execute color management by using the ILS 200 in place of the colorimeter 570. The table generation unit 522 generates a Lab conversion table by a similar procedure as with the density conversion table, stores it to the memory 514, and sets it to the Lab conversion unit 515. A configuration may be taken such that a transformation matrix is employed in place of a Lab conversion table.

Second Embodiment

Figure 12A:
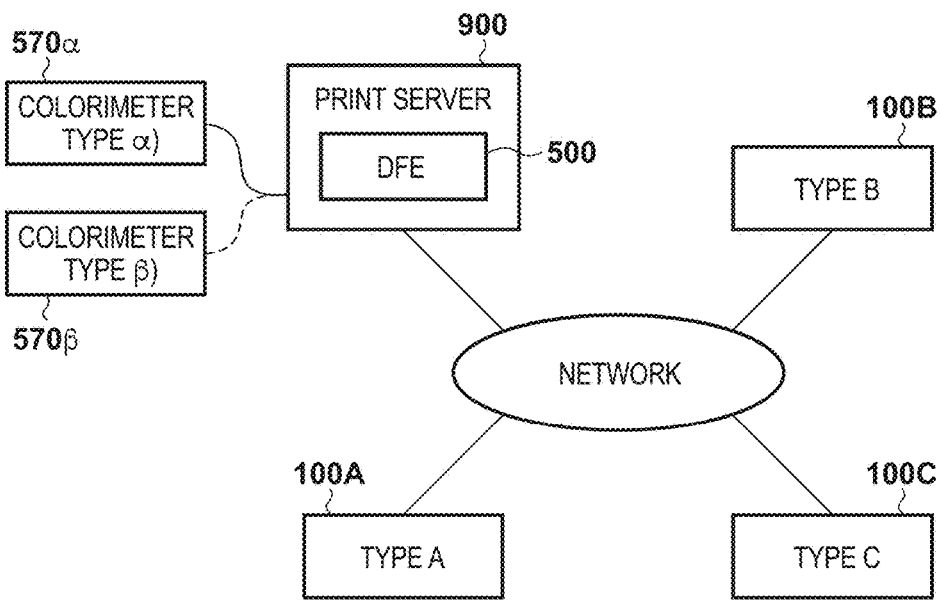
FIGS. 12A and 12B are views illustrating an image forming system including a Digital Font End (DFE).

In the first embodiment, one DFE 500 and one image forming apparatus 100 are connected. As FIG. 12A illustrates, however, a plurality of image forming apparatuses 100A, 100B, and 100C may be connected via a network to the DFE 500 mounted on a print server 900, and the like. Here, a layout rule of a test chart for the image forming apparatus 100A is assumed to be classified as type A. Here, a layout rule of a test chart for the image forming apparatus 100B is assumed to be classified as type B. Here, a layout rule of a test chart for the image forming apparatus 100C is assumed to be classified as type C. The layout rule may also be called a measurement rule. There are also various layout rules of the colorimeter 570 that can connect to the DFE 500. Here, a layout rule of a test chart for a colorimeter 570α is assumed to be classified as type α. A layout rule of a test chart for a colorimeter 570β is assumed to be classified as type β. The DFE 500 in such a case must generate a shared test chart that satisfies both the layout rule of the ILS 200 and the layout rule of the colorimeter 570.

Figure 15:
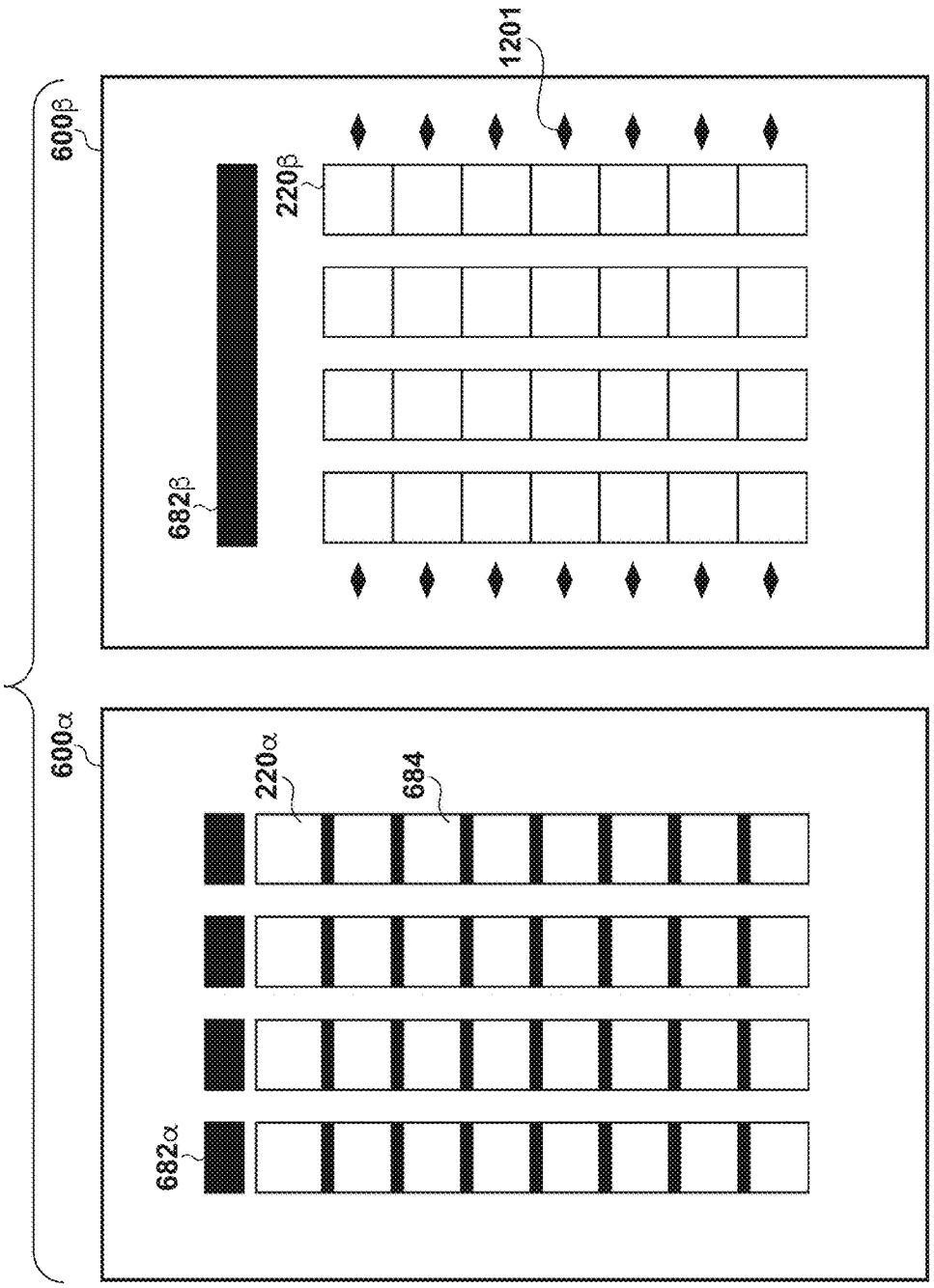
FIG. 15 is a view illustrating test charts.

FIG. 13 is a table exemplifying various layout rules. A layout rule may be stored in the ROM 502 for example. FIG. 14 illustrates test charts 600A to 600C corresponding to types A to C. FIG. 15 illustrates test charts 600α to 600β corresponding to types α and β. Note that the same reference numerals are attached to parts similar to the previously described parts. A to C, α, and β attached to the end of a reference numeral indicate a type. The types A to C indicate layout rules according to the type of ILS 200 installed in the image forming apparatus 100. The type α and the type β indicate layout rules according to the type of the colorimeter 570.

As FIG. 13 illustrates, the type A uses a spectral reflectance sensor as the ILS 200. For this reason, one position bar 682A is arranged per one patch group column. Note, because uniformity of the measurement image 220A is not required in the type A, a plurality of patch sizes are employed. The measurement image may be called a test image or a patch. A patch group of four columns is arranged because there are four sensors. As described above, the four columns of a patch group correspond to Y, M, C, and K. Because a relationship between the position of each measurement image 220A and the position of the position bar 682A is known beforehand, the measurement timing is a specified timing. In other words, the measurement timing of the measurement image 220A is determined in advance from the timing at which the ILS 200 detected the position bar 682A, the distance between the position bar 682A and the measurement image 220A, and the conveyance speed of the test chart 600A.

As FIG. 13 illustrates, the type B uses an RGB sensor as the ILS 200. For this reason, two position bars 682B are arranged per patch group column as illustrated in FIG. 14. An RGB sensor is more easily influenced by the conveying speed of the sheet 110 compared to a spectral reflectance sensor. The measurement timing of the measurement image 220B is corrected by using the plurality of position bars 682B arranged on the test chart 600B. Note, because uniformity of the measurement image 220B is required in the type B, a single patch size is employed. A patch group of four columns is arranged because there are four sensors. Because a relationship between the position of each measurement image 220B and the position of the position bar 682B is known beforehand, the measurement timing is a specified timing. In other words, the measurement timing of each measurement image 220B is dynamically corrected based on the position bar 682 detection timing.

As FIG. 13 illustrates, the type C employs an RGB sensor as an inline sensor. For this reason, two position bars 682C are arranged per column as illustrated in FIG. 14. Note, because uniformity of the measurement image 220C is required in the type C, a single patch size is employed. A patch group of two columns is arranged because there are two sensors. This means that there are a greater number of sheets of the test chart 600C than the number of sheets of the test chart 600B. Because a relationship between the position of each measurement image 220C and the position of the position bar 682C is known beforehand, the measurement timing is a specified timing. In other words, the measurement timing of each measurement image 220C is dynamically corrected based on the position bar 682 detection timing.

As FIG. 13 illustrates the type α uses a spectral reflectance sensor as the colorimeter 570. Although the size of the measurement image 220α is arbitrary in the type α, uniformity is required. For this reason, one patch size is employed. As FIG. 15 illustrates, the measurement timing of each measurement image 220α is determined based on position bars 682α or the separators 684 and 685. The white separator 685 may be employed in accordance with the density of the two adjacent measurement images 220α as described above.

As FIG. 13 illustrates the type β uses a spectral reflectance sensor as the colorimeter 570. Although the size of the measurement image 220β is arbitrary in the type β, uniformity is required. For this reason, one patch size is employed. As FIG. 15 illustrates, the measurement timing of each measurement image 220β is determined based on the position bar 682β. Also, a diamond shaped conveyance marker 1201 is necessary for controlling the conveyance speed of a test chart 600β with the type β. The conveyance marker 1201 is arranged along two sides (example: the long sides) parallel to the conveyance direction of the test chart 600β. Note, in a case in which the colorimeter 570 moves, the conveyance direction of the test chart 600β means the movement direction of the colorimeter 570.

Generation of a Shared Test Chart

FIG. 16 is a flowchart illustrating processing to generate a shared test chart. This generation processing corresponds to the aforementioned step S801. This generation processing is started when the operator inputs an instruction for generation of a density conversion table via the operation unit 504. The CPU 501 executes the following processing by loading a generation program saved in the ROM 502 to the RAM 503. The CPU 501 functions as the test pattern generation unit 513 by the CPU 501 executing the generation program. The test pattern generation unit 513 may be implemented in the control unit 508 in place of the aforementioned CPU 501. In such a case, the following processing is executed by the test pattern generation unit 513.

The CPU 501 accepts a selection (designation) of the ILS 200 type through the operation unit 504 in step S1301. As FIG. 17A illustrates, the CPU 501 may display a user interface (UI) 1400 for generation of the density conversion table to the display apparatus of the operation unit 504. The UI 1400 has a selection unit 1401 for accepting a selection of the ILS 200 type. The operator selects one of the selection candidates displayed on the selection unit 1401.

The CPU 501 accepts a selection (designation) of the colorimeter type through the operation unit 504 in step S1302. As illustrated in FIG. 17A, the UI 1400 has a selection unit 1402 for accepting a selection of the colorimeter 570 type. The operator selects one of the selection candidates displayed on the selection unit 1402.

The CPU 501 obtains from the ROM 502 a layout rule corresponding to the selected ILS 200 type and a layout rule corresponding to the selected colorimeter 570 type in step S1303. The ROM 502 stores the layout rules corresponding to each of the plurality of types. The CPU 501 may obtain a layout rule corresponding to the ILS 200 type from a server connected via the network and a layout rule corresponding to the selected colorimeter 570 type. Each type and layout rule may be associated via the model name of the image forming apparatus 100 or the model name of the colorimeter. The model name may be a product code, or the like.

The CPU 501 determines a layout that satisfies both layout rules in step S1304. The CPU 501 analyzes both layout rules and determines the layout of the measurement image 220 as follows.

Existence or Absence of a Separator

Figure 18:
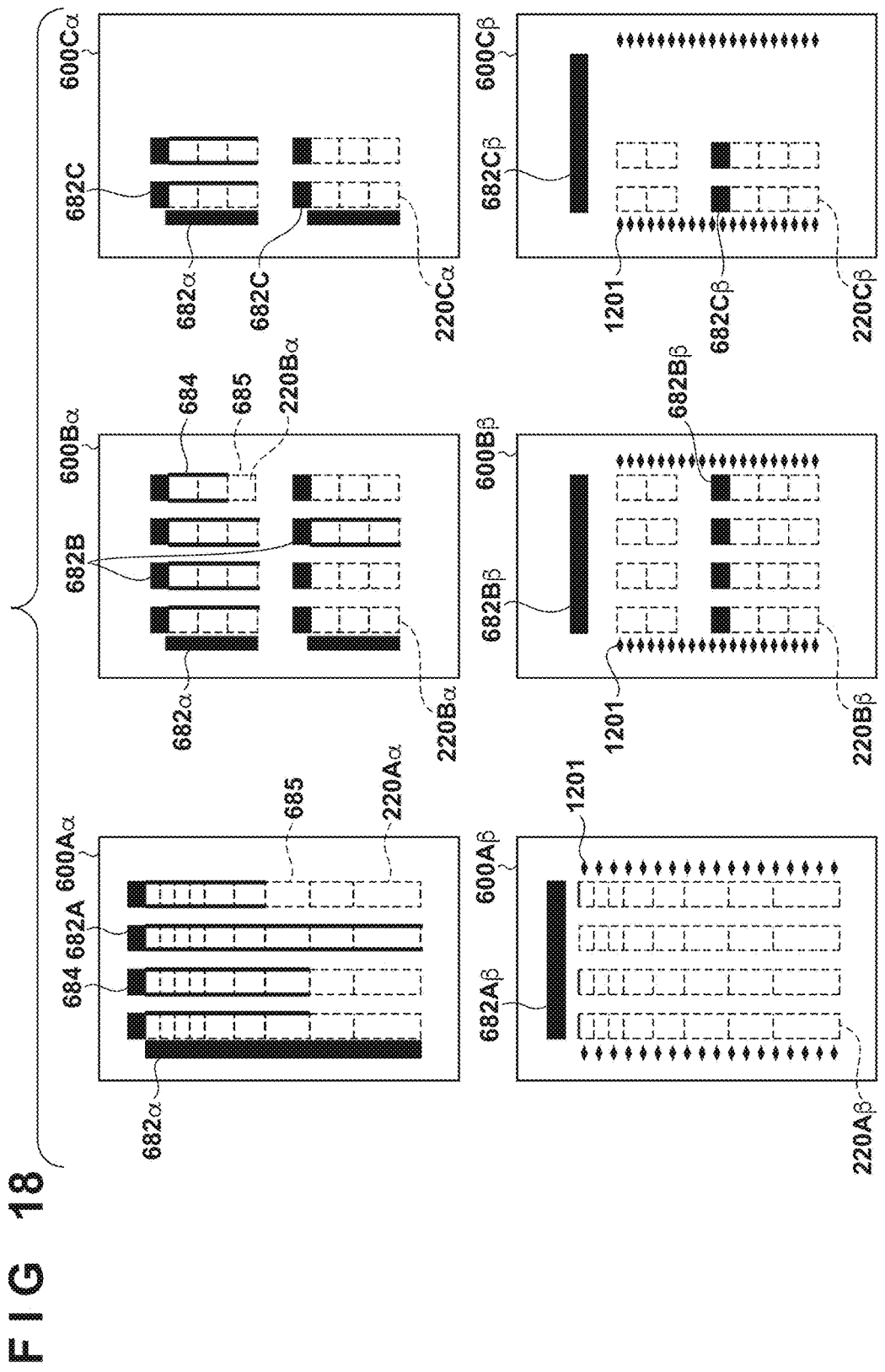
FIG. 18 is a view illustrating shared test charts.

The CPU 501 analyzes the layout rules for the colorimeter 570 and decides whether or not the layout rules define that the separators 684 and 685 are to be provided. The type α requires the separators 684 and 685 as FIG. 13 illustrates. In such a case, it is necessary that the scanning direction of the ILS 200 and the scanning direction of the colorimeter 570 be perpendicular. In other words, the CPU 501 employs a perpendicular layout as illustrated in FIG. 6A. When the type α is selected, one of the test charts 600Aα, 600Bα, and 600Cα, as FIG. 18 illustrates, in which a perpendicular layout is employed, is generated. For example, the CPU 501 generates the test chart 600Aα if the type A is selected. In the test charts 600Aα, 600Bα, and 600Cα, a shorter side direction (rightward direction) is the scanning direction of the colorimeter 570. For this reason, the separator 684 or the separator 685 is arranged at left and right of each measurement image 220. The position bars 682A, 682B, and 682C for the ILS 200 and a position bar 682α for the colorimeter 570 are independently arranged in the perpendicular layout.

Meanwhile, the separator 684 is not necessary for the type β. For this reason, the CPU 501 employs a parallel layout in which the scanning direction of the ILS 200 and the scanning direction of the colorimeter 570 are parallel. When the type β is selected, one of the test charts 600Aβ, 600Bβ, and 600Cβ, as FIG. 18 illustrates, in which a parallel layout is employed, is generated. The position bar 682 for the ILS 200 and the position bar 682 for the colorimeter 570 are shared in the parallel layout. As FIG. 18 illustrates, the position bars 682Aβ, 682Bβ, and 682Cβ shared in the test charts 600Aβ, 600Bβ, and 600Cβ, respectively, are arranged.

Number of Sensors

The CPU 501 analyzes the layout rules of the ILS 200 and obtains the number of the ILSs 200. The plurality of ILSs 200 are arranged in the conveyance path in order for the number of sheets of the test chart 600 to be reduced and the read time of the measurement image 220 to be shortened. The CPU 501 arranges on the test chart 600 patch columns of a number matching the number of sensors defined by the layout rules of the ILS 200. As FIG. 18 illustrates, there are four patch columns because the number of type A and B sensors is four. This example is the test charts 600Bα, 600Aβ, and 600Bβ. There are two patch columns because the number of type C sensors is two. This example is the test charts 600Cα and 600Cβ. In this way, the numbers of sheets of the test chart 600 of the types A and B ends up being half the number of sheets of the test chart 600 of the type C and the measurement time is also halved.

Type of Sensor

The CPU 501 analyzes the layout rules of the ILS 200 and obtains the type of the sensor. The CPU 501 determines, based on the type of sensor, which is defined by the layout rules of the ILS 200, the number of the position bars 682 for the ILS 200 per column. Because the type A is for a spectral reflectance sensor, the CPU 501 arranges one position bar 682 per column. This example is the test charts 600Aα and 600Aβ. Because the types B and C are for RGB sensors, the CPU 501 arranges two position bars 682 per column. In this example is the test charts 600Bα, 600Cα, 600Bβ, and 600Cβ. As the test charts 600Bα, 600Cα, 600Bβ, and 600Cβ indicate, the position bars 682B, 682C, 682Bβ, and 682Cβ are arranged at a plurality of positions differing in the scanning direction of the ILS 200.

Existence or Absence of a Conveyance Marker

The CPU 501 analyzes the layout rules for the colorimeter 570 and decides whether or not the layout rules define that the conveyance marker 1201 is to be provided. The conveyance marker 1201 is necessary for conveyance of the test chart 600 depending on the type of the colorimeter 570. According to the layout rules illustrated in FIG. 13, the conveyance marker 1201 is set to be necessary for the type β. The CPU 501 arranges the conveyance marker 1201 in the shared test chart in a case in which the conveyance marker 1201 is necessary for layout rules of the colorimeter 570. This example is the test charts 600Aβ, 600Bβ, and 600Cβ.

In step S1305, the CPU 501 generates image data for realizing the test chart 600 in accordance with the determined layout rules. The image data may be portable document format (PDF) data. In such a case, the PDF data is converted into bitmap data in the RIP unit 509 and is color converted in the color conversion unit 510.

In step S1306, the CPU 501 transmits the print instruction of the test chart 600 to the image forming apparatus 100. The CPU 501 transmits the image data of the test chart 600 to the image forming apparatus 100 as well. These are transmitted through the printer IF 506. By this arrangement, the image forming apparatus 100 generates the test chart 600 by forming the measurement image 220 on the sheet 110 in accordance with the print instruction and the image data.

Third Embodiment

In the second embodiment, the CPU 501 analyzes the layout rules and dynamically generates a shared test chart. Image data of the test chart 600 in accordance with combinations of the ILS 200 type and the colorimeter 570 type is stored in advance, however, in the ROM 502.

Figure 19:
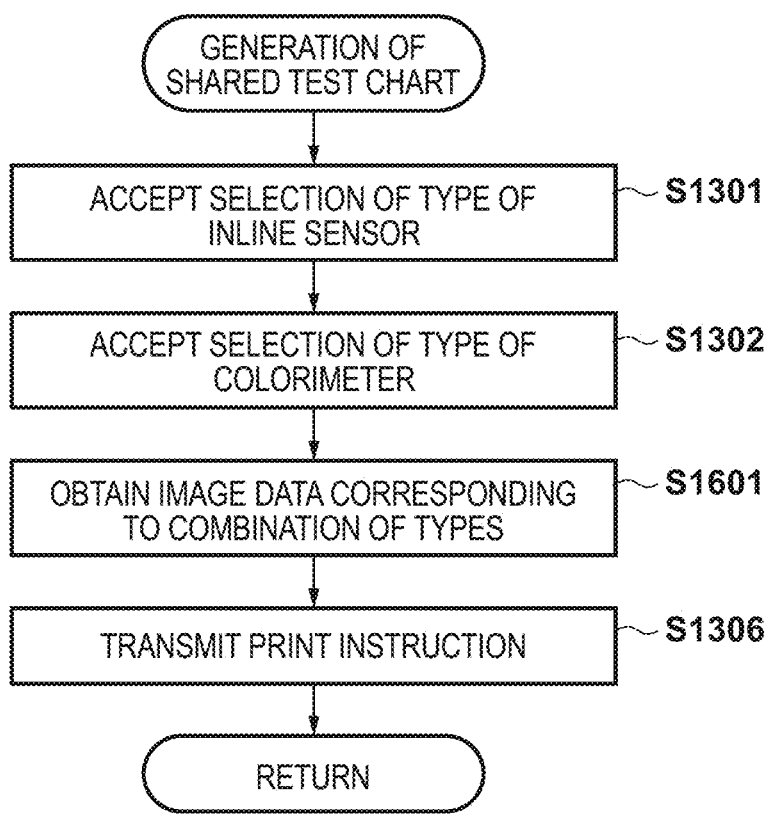
FIG. 19 is a flowchart illustrating a method of generating a shared test chart.

As FIG. 19 illustrates, when the ILS 200 type is selected in step S1301 and the colorimeter 570 type is selected in step S1302, the CPU 501 advances the processing to step S1601. In step S1601, the CPU 501 obtains from the ROM 502 the image data of the test chart 600 in accordance with the combination of the ILS 200 type and the colorimeter 570 type. Image data of the test chart 600 corresponding to various combinations is stored in the ROM 502. In step S1306, the CPU 501 transmits the print instruction and the image data to the image forming apparatus 100. Note, a configuration may be taken such that the type of the image data can be loaded by the RIP unit 509. For example, a CMYK file of any format, such as a tag image file format (TIFF), PDF, an Encapsulated PostScript (EPS) vector format, and a PostScript (PS) format, is saved in the ROM 502. The image data is generated by the RIP unit 509 based on the CMYK file and the CPU 501 transmits the image data tone corrected as necessary by the tone correction unit 511 to the image forming apparatus 100. It is not necessary for the image data (bitmap data) generated from the CMYK file to pass through the color conversion unit 510.

Fourth Embodiment

Figure 12B:
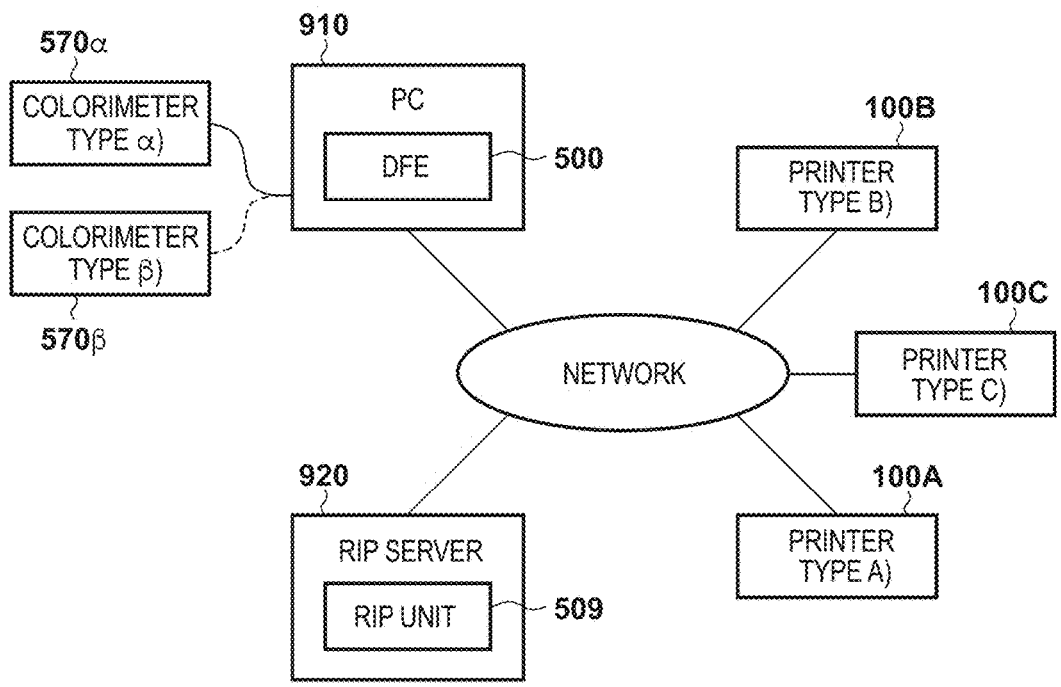

The DFE 500 may be implemented in a PC 910, which is an information processing apparatus as FIG. 12B illustrates. In other words, the CPU of the PC 910 may function as the aforementioned DFE 500 by executing a program. Note, the RIP unit 509 may be implemented in a RIP server 920. The PC 910 obtains or generates the image data of the shared test chart and transmits it to the RIP server 920. As FIG. 17B illustrates, the CPU 501 of the DFE 500 implemented in the PC 910 displays the UI 1400 on the operation unit 504. A save button 1404 is arranged on the UI 1400. The CPU 501 accepts the name of the image data of the shared test chart through the operation unit 504 and saves an image file with the accepted name to the ROM 502 (a hard disk drive, or the like). With respect to this, the CPU 501 can skip the processing to generate the image data when an identical layout combination is selected. The RIP unit 509 of the RIP server 920 loads the received image data and transmits it to the image forming apparatus 100. By this arrangement, the image forming apparatus 100 generates the shared test chart. The image forming apparatus 100 transmits results of measuring the shared test chart by the ILS 200 to the DFE 500 implemented in the PC 910. The DFE 500 implemented in the PC 910 obtains the results of measuring the shared test chart by using the colorimeter 570. The DFE 500 implemented in the PC 910 generates a density conversion table based on these results.

Summary

The station 120, or the like, is one example of an image forming unit that forms a plurality of measurement images 220ab on the sheet 110 as illustrated in FIG. 1, and the like. The ILS 200 is one example of a first measurement unit that measures the measurement images 220ab formed on the sheet 110. The colorimeter 570 is one example of a second measurement unit or an external measurement device that measures the measurement images 220ab formed on the sheet 110. The table generation unit 522 is one example of a generation unit that generates a conversion condition. A first pattern image is formed on the sheet 110 in order to generate or update the aforementioned tone correction condition. Also, a second pattern image is formed in order to generate or update a density conversion table. Note, the first pattern image and the second pattern image may be the same. In this way, the table generation unit 522 is one example of a second generation unit. The table generation unit 522 causes a sheet to be conveyed by indirectly controlling the conveyance unit and causes a second pattern image including a plurality of second measurement images to be formed on the sheet by the image forming unit. The table generation unit 522 causes the second pattern image on the sheet to be measured by controlling the measurement unit. Also, the table generation unit 522 obtains second measurement data corresponding to the measurement result for the second pattern image on the sheet output from the external measurement device. The table generation unit 522 generates a conversion condition based on the second measurement data and the measurement result of the second pattern image by the measurement unit. Note, the second pattern image includes a plurality of second measurement images. The plurality of the second measurement images read by the ILS 200 forms a first image group. Also, the plurality of the second measurement images read by the colorimeter 570 forms a second image group. As described above, the plurality of second measurement images forming the first image group and the plurality of second measurement images forming the second image group may be the same. The density conversion table that the density converter 512 uses is one example of a conversion condition for converting a result of measuring by the ILS 200 into a result of measuring by the colorimeter 570 based on a result of measuring the measurement images by the ILS 200 and a result of measuring the measurement images by the colorimeter 570. The image forming apparatus 100 forms the first image group and the second image group on the sheet 110. The first image group has a plurality of measurement images measured in order by being scanned by the ILS 200 in a first direction. In FIG. 6A, a plurality of cyan measurement images 220ab lined up in a sub-scanning direction (the conveyance direction of the test chart) is one example of the first image group. The second image group has a plurality of measurement images measured in order by being scanned by the colorimeter 570, which is different from the first measurement unit in a second direction different from the first direction. In FIG. 6A, cyan, magenta, yellow, and black measurement images 220ab lined up in the main-scanning direction are one example of the second image group. As FIG. 6A and FIG. 9 illustrate, the plurality of measurement images 220ab in the first image group and the plurality of measurement images 220ab in the second image group are the same measurement images. In other words, the plurality of second measurement images measured in order by being scanned by the measurement unit in the conveyance direction form the first image group in the second pattern image. The plurality of second measurement images measured in order by being scanned by the external measurement device in a direction perpendicular to the conveyance direction form the second image group in the second pattern image. In this way, the number of sheets of the sheet 110 for the test charts is reduced because the measurement images 220ab of the ILS 200 and the measurement images 220ab for the colorimeter 570 are shared. Also, by virtue of this embodiment, accuracy of generation of the density conversion table 543 for converting a measurement result of the ILS 200 into a measurement result of the colorimeter 570 is improved. This is because it becomes possible for the ILS 200 and the colorimeter 570 to measure the same measurement image on the same sheet in spite of the fact that their measurement rules differ from each other.

As FIG. 6A, and the like, illustrate, a measurement start mark that allows the colorimeter 570 to recognize the start of measurement is formed on the upstream side of the measurement image 220ab that is measured first by the colorimeter 570 scanning in the second direction, among the plurality of measurement images belonging to the first image group. In other words, the position bar 682b is one example of a measurement start mark. The upstream side may be called a scan start side. As FIG. 6A illustrates, an end mark that allows the colorimeter 570 to recognize an end position of the measurement image that is measured first by the colorimeter 570 on the downstream side of the measurement image measured first, by scanning in the second direction, among the plurality of measurement images belonging to the first image group, is formed. The downstream side may be called a scan end side. The black separator 684 or the white separator 685 arranged neighboring the right of the cyan measurement image 220ab is one example of an end mark. Note that the black separator 684 or the white separator 685 arranged neighboring the left of the black measurement image 220ab of even numbered rows in FIG. 9 is one example of an end mark. The image density (optical density) of the black separator 684 or the white separator 685 may be determined in accordance with the spectral reflectance of the measurement image measured first as FIG. 6A illustrates. This is because a larger optical density difference between a separator and a measurement image makes it easier to distinguish the two.

In FIG. 6A, and the like, the magenta, cyan, and black measurement images 220ab are one example of measurement images measured second or later by the colorimeter 570 scanning in the second direction, among the plurality of the measurement images belonging to the first image group. The separators 684 and 685, which allow recognition of the start position and the end position of each measurement image, are formed at the upstream side and the downstream side of the magenta, cyan, and black measurement images 220ab. As described above, the image density of the separators 684 and 685 is determined in accordance with the spectral reflectance of the measurement images 220ab adjacent to the separators.

A first image group of n columns is arranged and a second image group of m rows is arranged in the test chart 600ab as described by using FIG. 6A, and the like. The colorimeter 570 may measure the second image group of an i-th row while scanning in the second direction and may measure the second image group of an i+1-th row while scanning in a direction opposite to the second direction as described by using FIG. 9.

As FIG. 4 illustrates, the density converter 512 is one example of a conversion unit that converts the measurement results of the ILS 200 into measurement results of the colorimeter 570 by using a conversion condition. The second calibration unit 521 is one example of an update unit that updates an image forming condition (γLUT) of the image forming apparatus 100 based on the measurement results of the colorimeter 570 obtained by the density converter 512. By this arrangement, it is possible to use the ILS 200 in place of the colorimeter 570. The image forming condition may be a tone correction condition for correcting tone characteristics of the image data. The image forming condition may also be a color management profile that the color conversion unit 510 uses.

The flapper 134 and a conveyance roller are one example of a conveyance unit that conveys the sheet 110 along the conveyance path. The ILS 200 measures the measurement images 220ab formed on the sheet 110 conveyed by the conveyance unit. The colorimeter 570 measures the measurement images 220ab formed on the sheet 110 discharged from the image forming apparatus 100.

By virtue of this embodiment, the DFE 500 is one example of an image processing apparatus to which the ILS 200 that measures the measurement images 220ab formed on the test chart 600ab and the colorimeter 570 that measures the measurement images 220ab formed on the test chart 600ab are connected. The ILS 200 may be indirectly connected to the DFE 500 via a plurality of interfaces.

Step S801, as illustrated by FIG. 8, is one example of a step of forming a plurality of measurement images 220ab on the sheet 110. Step S802 is one example of a step of measuring a plurality of measurement images 220ab by causing the ILS 200 to move relatively in the first direction with respect to the plurality of measurement images 220ab formed on the sheet 110. Step S804 is one example of a step of measuring a plurality of measurement images 220ab by causing the colorimeter 570 to move relatively in the second direction with respect to the plurality of measurement images 220ab formed on the sheet 110. Step S805 is one example of a step of generating a conversion condition for converting a measurement result by the ILS 200 into that of the colorimeter 570 based on a measurement result by the ILS 200 and a measurement result by the colorimeter 570.

An arrangement of the plurality of measurement images 220ab in the first direction on the test chart 600ab as illustrated in FIG. 6A is an arrangement according to a measurement rule of the ILS 200. An arrangement of the plurality of measurement images 220ab in the second direction on the test chart 600ab as illustrated in FIG. 6B is an arrangement according to a measurement rule of the colorimeter 570. The number of sheets 110 that measurement images 220ab forms is reduced by providing such a test chart 600ab. Also, accuracy of generation of the density conversion table for converting a measurement result of the ILS 200 into a measurement result of the colorimeter 570 is improved.

The DFE 500 is one example of an image processing apparatus that causes the image forming apparatus 100 to form on the same sheet a plurality of test images (example: the measurement images 220) to be read by a first measurement device and a second measurement device. The ILS 200 is one example of the first measurement device. The colorimeter 570 is one example of the second measurement device. The ROM 502 is one example of the storage unit. The ROM 502 stores a first layout rule that defines a layout of a plurality of test images such that the first measurement device is able to measure the plurality of test images. The ROM 502 stores a second layout rule that defines a layout of a plurality of test images such that the second measurement device is able to measure the plurality of test images. The CPU 501 and the printer IF 506 are one example of a transmission unit that transmits to the image forming apparatus 100 image data having a plurality of test images to be arranged on a sheet such that the first layout rule and the second layout rule are both satisfied. In this way, the test chart 600 is generated such that the layout rules of the ILS 200 and the layout rules of the colorimeter 570 are both satisfied. This test chart 600 is a shared test chart that can be measured by both the ILS 200 and the colorimeter 570. Accordingly, the number of sheets, on which measurement images such as the measurement images 220 are formed, is reduced. Also, a measurement error due to a difference in sheets 110 does not occur because the ILS 200 and the colorimeter 570 measure the same test chart 600.

Figure 20A:
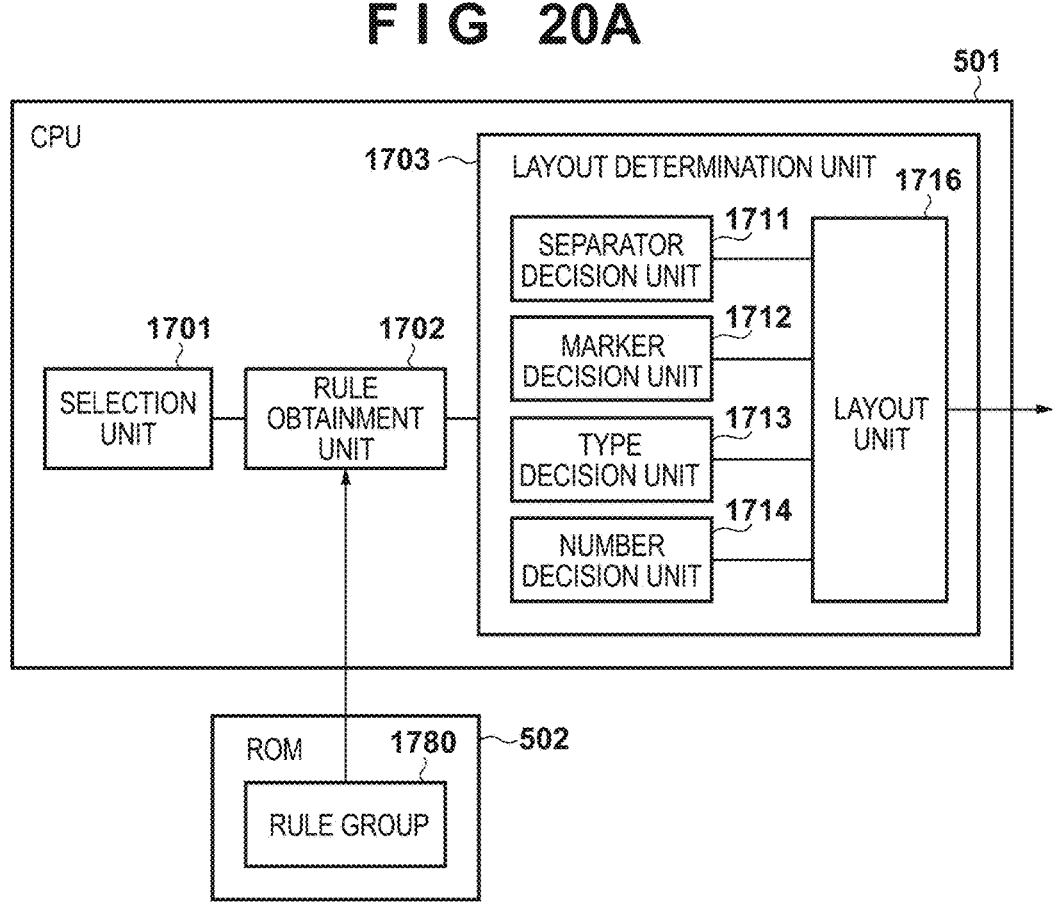
FIGS. 20A and 20B are views for describing a function realized by a central processing unit.
Figure 20B:
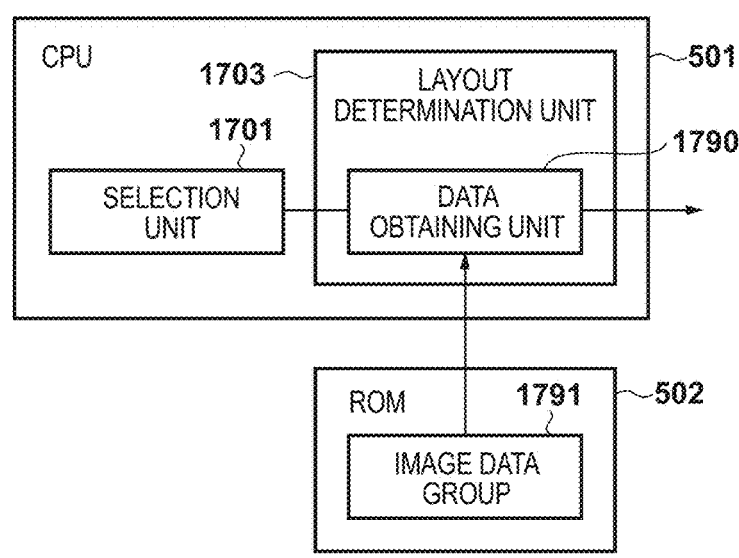

FIG. 20A and FIG. 20B illustrate a function of the CPU 501 or the test pattern generation unit 513. A selection section 1701 is realized by the CPU 501, the operation unit 504, and the UI 1400, for example. The selection section 1701 is one example of a selection unit that selects the type of the first measurement device (example: types A, B, and C) and the type of the second measurement device (example: types $\alpha$ and $\beta$). A rule obtainment section 1702 obtains from the ROM 502 a first layout rule corresponding to the type of the first measurement device selected by the selection section 1701. The rule obtainment section 1702 obtains from the ROM 502 a second layout rule corresponding to the type of the second measurement device selected by the selection section 1701. The ROM 502 stores a rule group 1780 including these layout rules. A layout determination section 1703 analyzes the first layout rule and the second layout rule, and determines the layout of the plurality of test images on the sheet such that the first layout rule and the second layout rule are both satisfied. The CPU 501 or the printer IF 506 transmits to the image forming apparatus 100 the image data for forming on the sheet the plurality of test images according to the determined layout. In this way, the image data for the test chart 600 may be dynamically generated. This eliminates the need for preparing image data in advance. For this reason, the present embodiment is advantageous from the perspective of effectively using the storage capacity of the ROM 502.

A separator decision section 1711 functions as a decision unit that decides whether or not the second layout rule specifies that the separator 684 is arranged between the plurality of test images. The second layout rule may specify that a separator 684 is arranged between a plurality of test images. In such a case, the layout section 1716 functions as a layout unit that arranges a plurality of test images on a sheet such that the scanning direction of the first measurement device and the scanning direction of the second measurement device are perpendicular. In such a case, the layout section 1716 additionally arranges a first trigger bar (example: the position bar 682A), for allowing the first measurement device to recognize a measurement start timing of the plurality of test images, along a first side of the sheet 110. The layout section 1716 arranges a second trigger bar (example: the position bar 682$\alpha$), for allowing the second measurement device to recognize a measurement start timing of the plurality of test images, along a second side of the sheet 110.

Meanwhile, there are cases in which the second layout rule does not specify that a separator 684 is arranged between a plurality of test images. In such a case, the layout section 1716 arranges a plurality of test images on a sheet such that the scanning direction of the first measurement device and the scanning direction of the second measurement device are parallel. Furthermore, the first trigger bar and the second trigger bar may be shared. The layout section 1716 may also arrange a shared trigger bar along the first side of the sheet 110. The first trigger bar is an image object for causing the first measurement device to recognize the measurement start timing of the plurality of test images. The second trigger bar is an image object for causing the second measurement device to recognize the measurement start timing of the plurality of test images. In FIG. 18, the position bars 682A$\beta$, 682B$\beta$, and 682C$\beta$ are one example of shared trigger bars.

A marker decision section 1712 analyzes the second layout rule and decides whether or not the second layout rule defines that the conveyance marker 1201, which is a reference of conveyance of the second measurement device, is arranged. In a case in which the second layout rule defines that the conveyance marker 1201, which is the reference of conveyance of the second measurement device, is arranged, the layout section 1716 arranges the conveyance marker 1201 along the second side of the sheet 110.

A type decision section 1713 may analyze the first layout rule and decide the type (example: a spectral reflectance sensor or an RGB sensor) of the ILS 200. As FIG. 13 illustrates, the ILS 200 may be an RGB sensor arranged in a conveyance path of the image forming apparatus 100. In such a case, the layout section 1716 arranges a plurality of first trigger bars at different positions in the conveyance direction of the sheet 110. As illustrated in FIG. 18, the position bars 682B, 682C, 682Bβ, and 682Cβ are one example of the plurality of first trigger bars.

A number decision section 1714 analyzes the first layout rule and decides the number of the ILSs 200. The layout section 1716 arranges a plurality of test images in a number of rows matching the number of sensors of the first measurement device, which is defined by the first layout rule. In other words, the layout section 1716 determines a number of patch rows such that it matches the number of sensors obtained by the number decision section 1714.

As FIG. 20B illustrates, the ROM 502 is one example of a storage unit that stores image data for forming a plurality of test images on the sheet for every combination of the type of the first measurement device and the type of the second measurement device. An image data group 1791 is image data (example: a YMCK file, a PDF file, and the like) corresponding to various combinations. The selection section 1701 selects the type of the first measurement device and the type of the second measurement device. A data obtainment section 1790 functions as a transmission unit that reads from the ROM 502 image data corresponding to a combination of the type of the first measurement device and the type of the second measurement device selected by the selection section 1701, and that transmits the image data to the image forming apparatus 100.

As FIG. 18 illustrates, the plurality of second measurement images are arranged on a sheet so as to satisfy both the first layout rule and the second layout rule. The first layout rule defines a layout of a plurality of second measurement images so that a measurement unit (example: the ILS 200) can measure the plurality of second measurement images. The second layout rule defines a layout of a plurality of second measurement images so that an external measurement device (example: the colorimeter 570) can measure the plurality of second measurement images.

As described above, the ROM 502 stores a program for causing a computer to function as each unit of the image processing apparatus. The ROM 502 is one example of a computer readable storage medium.

Other Embodiments

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus connected communicably to an external measurement device, the apparatus comprising:
   (A) a printer configured to print an image on a sheet;
   (B) a sensor provided on a conveyance path along which the sheet is conveyed, and configured to measure a measurement image printed on the sheet by the printer; and
   (C) a controller configured:
      (a) to select a layout including a plurality of test images and a separator, the layout being at least one of (i) a first layout including (1) a plurality of first test images, and (2) a first separator, and (ii) a second layout that is different from the first layout, the second layout including (1) a plurality of second test images that are different from the first test images, and (2) a second separator that is different from the first separator;
      (b) to control the printer to print the plurality of test images and the separator on the sheet, the separator being used to control a measurement timing of an external measurement device, wherein, in a case in which the first layout is selected, the controller controls the printer to print the plurality of first test images and the first separator on the sheet, and, in a case in which the second layout is selected, the controller controls the printer to print the plurality of second test images and the second separator on the sheet;
      (c) to control the sensor to measure the plurality of test images printed on the sheet, thereby producing a measurement result of the plurality of test images printed on the sheet;
      (d) to obtain measurement data related to the plurality of test images, the measurement data being output from the external measurement device, thereby producing obtained measurement data; and
      (e) to generate a conversion condition based on the measurement result of the plurality of test images and the obtained measurement data, wherein the conversion condition is used to convert the measurement result of the plurality of test images into a measurement result of an external measurement device.

2. The image forming apparatus according to claim 1, wherein a length of the plurality of second test images in a conveyance direction of the sheet is different than a length of the plurality of first test images in the conveyance direction, and wherein a length of the second separator in the conveyance direction is different than a length of the first separator in the conveyance direction.

3. The image forming apparatus according to claim 1, wherein the layout is at least one of (i) the first layout, (ii) the second layout, and (iii) a third layout including a plurality of third test images, and, in a case in which the third layout is selected, the controller controls the printer to print the plurality of third test images and a conveyance marker on the sheet without printing the separator, and the conveyance marker is used to control a movement of the external measurement device.

4. The image forming apparatus according to claim 1, wherein a color of the separator is black.

5. An image processing apparatus that executes image processing on image data to be transferred to a printer, the apparatus comprising:
(A) a first interface configured to communicate with the printer;
(B) a second interface configured to communicate with a measurement device; and
(C) a controller configured:
  (a) to select a layout including a plurality of test images and a separator, the layout being at least one of (i) a first layout including (1) a plurality of first test images, and (2) a first separator, and (ii) a second layout that is different from the first layout, the second layout including (1) a plurality of second test images that are different from the first test images, and (2) a second separator that is different from the first separator;
  (b) to transfer measurement image data via the first interface, the measurement image data being used to print the plurality of test images and the separator on a sheet, and the separator being used to control a measurement timing of an external measurement device, wherein, in a case in which the first layout is selected, the controller transfers first measurement image data via the first interface, the first measurement image data being used to print the plurality of first test images and the first separator on a sheet, and, in a case in which the second layout is selected, the controller transfers second measurement image data via the first interface, the second measurement image data being used to print the plurality of second test images and the second separator on the sheet;
  (c) to obtain a result of measuring the plurality of test images, printed on the sheet, by a sensor provided for the printer via the first interface, thereby producing an obtained sensor measurement result;
  (d) to obtain a result of measuring the plurality of test images, printed on the sheet, by the external measurement device via the second interface, thereby producing an obtained external measurement device measurement result; and
  (e) to generate a conversion condition based on the obtained sensor measurement result and the obtained external measurement device measurement result, wherein the conversion condition is used to convert the obtained sensor measurement result into a measurement result of an external measurement device.

6. The image processing apparatus according to claim 5, wherein a length of the plurality of second test images in a conveyance direction of the sheet is different than a length of the plurality of first test images in the conveyance direction, and wherein a length of the second separator in the conveyance direction is different than a length of the first separator in the conveyance direction.

7. The image processing apparatus according to claim 5, wherein the layout is at least one of (i) the first layout, (ii) the second layout, and (3) a third layout including a plurality of third test images, and, in a case in which the third layout is selected, the controller transfers third measurement image data via the first interface,
wherein the third measurement image data is used to print the plurality of third test images and a conveyance marker on the sheet without printing the separator, and
wherein the conveyance marker is used to control a movement of the external measurement device.

8. The image processing apparatus according to claim 5, wherein a color of the separator is black.

9. An image forming apparatus comprising:
(A) an image printer configured to print an image on a sheet;
(B) a conveyance roller configured to convey the sheet along a conveyance path;
(C) a sensor provided on the conveyance path, and configured to measure a measurement image on the sheet; and
(D) a controller configured:
  (a) to control the image printer to print a first chart including a plurality of measurement images;
  (b) to convert, based on a conversion condition, a measurement result of the first chart by the sensor, thereby producing a converted measurement result;
  (c) to control the image printer to print a second chart including a first measurement image, a second measurement image, and a plurality of separators, the plurality of separators being used to control a measurement timing of an external measurement device, wherein the second measurement image is formed at a position different in a predetermined direction, which is perpendicular to a conveyance direction in which the conveyance roller conveys the sheet, from a position at which the first measurement image is formed, wherein the second measurement image overlaps the first measurement image in the conveyance direction, and wherein the plurality of separators are formed between the first measurement image and the second measurement image in the predetermined direction;
  (d) to control the sensor to measure the second chart printed on the sheet, thereby producing a sensor measurement result;
  (e) to obtain measurement data related to the second chart, the measurement data related to the second chart being output from an external measurement device, thereby producing obtained measurement data; and
  (f) to generate the conversion condition based on the sensor measurement result and the obtained measurement data,
wherein the external measurement device measures the first measurement image and the second measurement image along the predetermined direction.

10. The image forming apparatus according to claim 9, wherein the plurality of separators includes (i) a first separator that is formed at a position adjacent to the first measurement image, and (ii) a second separator that is formed at a position adjacent to the second measurement image, and that is formed apart from the first separator in the predetermined direction.

11. The image forming apparatus according to claim 9, wherein the second chart further includes a trigger image printed by the image printer, the trigger image being used by the external measurement device to determine a measurement timing of the external measurement device based on the trigger image, and the trigger image being formed at a position opposite to the second measurement image with respect to the first measurement image in the predetermined direction, and a length of the trigger image in the predetermined direction is greater than a respective length of the plurality of separators.

12. The image forming apparatus according to claim 9, wherein the second chart further includes a first trigger image and a second trigger image printed by the image printer, the first trigger image and the second trigger image being respectively used for determining a measurement timing of the external measurement device, the first trigger image being formed at a position opposite to the second trigger image with respect to the first measurement image in the predetermined direction, and the second trigger image being formed at a position opposite to the first measurement image with respect to the second measurement image in the predetermined direction, a length of the first trigger image in the predetermined direction being greater than a length of respective of the plurality of separators, and a length of the second trigger image in the predetermined direction being greater than a length of respective of the plurality of separators.

13. The image forming apparatus according to claim 9, further comprising (E) an image processor configured to correct image data based on a tone correction condition, wherein the controller generates the tone correction condition based on the converted measurement result, and the image printer prints the image based on the image data corrected by the image processor.

14. An image processing apparatus that communicates with a printer having a sensor for measuring a measurement image on a sheet, the image processing apparatus comprising:
(A) an interface to which an external measurement device is communicable; and
(B) a controller configured:
(a) to control the printer to print a first chart including a plurality of measurement images on a sheet;
(b) to control the sensor of the printer to measure the first chart, thereby producing a sensor measurement result of the first chart;
(c) to obtain a measurement result of the first chart measured by the sensor of the printer, thereby producing an obtained measurement result of the first chart;
(d) to convert, based on a conversion condition, the measurement result of the first chart, thereby producing a converted measurement result;
(e) to control the printer to print a second chart including a first measurement image, a second measurement image, and a plurality of separators, the plurality of separators being used to control a measurement timing of an external measurement device, wherein the second measurement image is formed at a position different in a predetermined direction, which is perpendicular to a conveyance direction in which a conveyance roller conveys the sheet, from a position at which the first measurement image is formed, wherein the second measurement image overlaps the first measurement image in the conveyance direction, and wherein the plurality of separators are formed between the first measurement image and the second measurement image in the predetermined direction;
(f) to control the sensor of the printer to measure the second chart, thereby producing a sensor measurement result of the second chart;
(g) to obtain a measurement result of the second chart measured by the sensor of the printer, thereby producing an obtained measurement result of the second chart;
(h) to obtain measurement data related to the second chart via the interface, the measurement data related to the second chart being output from the external measurement device, thereby producing external measurement device obtained measurement data; and
(i) to generate the conversion condition based on the sensor measurement result of the second chart and the external measure device obtained measurement data,
wherein the external measurement device measures the first measurement image and the second measurement image along the predetermined direction.

15. The image processing apparatus according to claim 14, wherein the plurality of separators includes (i) a first separator that is formed at a position adjacent to the first measurement image, and (ii) a second separator that is formed at a position adjacent to the second measurement image, and that is apart from the first separator in the predetermined direction.

16. The image processing apparatus according to claim 14, wherein the second chart further includes a trigger image printed by the printer, the trigger image being used by the external measurement device to determine a measurement timing of the external measurement device based on the trigger image, the trigger image being formed at a position opposite to the second measurement image with respect to the first measurement image in the predetermined direction, and a length of the trigger image in the predetermined direction being greater than a length of respective of the plurality of separators.

17. The image processing apparatus according to claim 14, wherein the second chart further includes a first trigger image and a second trigger image printed by the printer, the first trigger image and the second trigger image being respectively used for determining a measurement timing of the external measurement device, the first trigger image being formed at a position opposite to the second trigger image with respect to the first measurement image in the predetermined direction, and the second trigger image being formed at a position opposite to the first measurement image in regard to the second measurement image in the predetermined direction, a length of the first trigger image in the predetermined direction being greater than a length of respective of the plurality of separators, and a length of the second trigger image in the predetermined direction being greater than a length of respective of the plurality of separators.

18. The image processing apparatus according to claim 14, wherein the controller is further configured (j) to generate a tone correction condition based the obtained measurement result of the first chart, and the tone correction condition is used for adjusting a density of an image printed by the printer.

* * * * *